(12) United States Patent
Bravo et al.

(10) Patent No.: US 6,823,886 B2
(45) Date of Patent: Nov. 30, 2004

(54) DISPENSER CONTAINMENT

(75) Inventors: Sergio M. Bravo, Los Alamitos, CA (US); Don K. Mukai, Pasadena, CA (US)

(73) Assignee: S. Bravo Systems, Inc., Commerce, CA (US)

(*) Notice: Subject to any disclaimer, the term of this patent is extended or adjusted under 35 U.S.C. 154(b) by 273 days.

(21) Appl. No.: 09/951,224

(22) Filed: Sep. 13, 2001

(65) Prior Publication Data

US 2003/0047211 A1 Mar. 13, 2003

(51) Int. Cl.$^7$ .......................... G01M 3/04; G01M 3/26; F16K 37/00
(52) U.S. Cl. .......................... 137/312; 73/40; 73/49.2; 137/557; 137/558; 141/94; 141/98; 141/198; 141/311 R; 220/918; 340/605
(58) Field of Search ................................ 137/312, 557, 137/558; 138/104, 113, 114; 73/40.5 R, 46, 49.1, 49.2, 49.3, 40; 141/86, 88, 94, 198, 311 R, 98; 405/52, 53, 54, 55, 154.1; 220/918; 340/605

(56) References Cited

U.S. PATENT DOCUMENTS

| | | | |
|---|---|---|---|
| 4,110,947 A | 9/1978 | Murray et al. | |
| 4,341,326 A | 7/1982 | Bravo | |
| 4,345,617 A | 8/1982 | Bravo | |
| 4,428,395 A | 1/1984 | Bravo | |
| 4,563,892 A | * 1/1986 | D'Aoust | ..................... 73/19.05 |
| 4,696,186 A | * 9/1987 | Sharp | ......................... 73/49.2 |
| 4,708,015 A | * 11/1987 | Sharp | ......................... 73/49.2 |
| 4,796,676 A | * 1/1989 | Hendershot et al. | ......... 73/49.2 |
| 4,842,163 A | 6/1989 | Bravo | |
| 4,916,939 A | * 4/1990 | Mogel | ......................... 73/49.2 |
| 4,925,046 A | * 5/1990 | Sharp | ........................ 220/4.12 |
| 4,932,257 A | 6/1990 | Webb | |

(List continued on next page.)

Primary Examiner—George L. Walton
(74) Attorney, Agent, or Firm—Samuel K. Simpson, Esq.; Greenberg Traurig, LLP

(57) ABSTRACT

A sump for inhibiting leakage of liquid includes a double wall for at least part of the sump, and an interstitial space between the double wall. An indicator liquid is located in the space, and a sensor is in fluid communication with the space such that a change in the pressure or liquid level in the interstitial space causes the sensor to indicate leakage into or from the interstitial space. The double wall includes a base, a wall directed upwardly from the base of the sump, and the upwardly directed wall includes an angular portion being directed at an angle from the base greater than 90 degrees relative to the base. A remote location of that portion is connected with a substantially upright wall portion for the sump. An aperture for an electrical conduit is located in the angular portion.

74 Claims, 11 Drawing Sheets

U.S. PATENT DOCUMENTS

| | | | |
|---|---|---|---|
| 4,934,866 A | 6/1990 | Gage | |
| 4,971,225 A | 11/1990 | Bravo | |
| 4,971,477 A | 11/1990 | Webb et al. | |
| 4,974,556 A | 12/1990 | Royse | |
| 4,977,935 A | 12/1990 | Durkee, Jr. et al. | |
| 5,020,358 A * | 6/1991 | Sharp | 73/49.2 |
| 5,039,367 A * | 8/1991 | Sharp | 73/49.2 |
| 5,058,854 A | 10/1991 | Bravo | |
| 5,072,609 A * | 12/1991 | Sharp | 73/49.2 |
| 5,096,087 A * | 3/1992 | Thomas | 137/312 |
| 5,099,894 A | 3/1992 | Mozeley, Jr. | |
| 5,100,024 A | 3/1992 | Bravo | |
| 5,135,324 A | 8/1992 | Bravo | |
| 5,152,859 A * | 10/1992 | Sharp | 73/49.2 |
| 5,285,829 A | 2/1994 | Bravo | |
| 5,289,842 A | 3/1994 | Bravo | |
| 5,297,896 A | 3/1994 | Webb | |
| 5,341,857 A | 8/1994 | Bravo | |
| 5,351,707 A | 10/1994 | Bravo | |
| 5,366,318 A | 11/1994 | Brancher | |
| 5,390,532 A | 2/1995 | Anthony | |
| D359,794 S | 6/1995 | Bravo | |
| 5,421,663 A | 6/1995 | Bravo | |
| 5,474,396 A | 12/1995 | Bravo | |
| 5,529,098 A | 6/1996 | Bravo | |
| 5,564,858 A | 10/1996 | Bravo | |
| 5,586,581 A | 12/1996 | Suwa | |
| 5,589,631 A * | 12/1996 | Spring et al. | 73/49.2 |
| 5,597,263 A | 1/1997 | Bravo | |
| 5,676,183 A | 10/1997 | Bravo | |
| 5,743,673 A | 4/1998 | Bravo | |
| 5,800,143 A | 9/1998 | Bravo | |
| 5,826,919 A | 10/1998 | Bravo et al. | |
| 5,882,045 A | 3/1999 | Bravo | |
| 5,944,361 A | 8/1999 | Bravo | |
| 5,955,657 A | 9/1999 | Bravo | |
| 5,988,698 A | 11/1999 | Bravo et al. | |
| 6,003,537 A | 12/1999 | Bravo | |
| 6,032,699 A | 3/2000 | Cochran et al. | |
| 6,053,539 A | 4/2000 | Bravo | |
| 6,164,345 A | 12/2000 | Haddox | |
| 6,209,560 B1 * | 4/2001 | Shaw | 137/557 |
| 6,209,562 B1 * | 4/2001 | Shaw | 137/557 |
| 6,217,083 B1 | 4/2001 | Bravo | |
| 6,230,735 B1 | 5/2001 | Bravo | |
| 6,244,290 B1 | 6/2001 | Reicin et al. | |
| 6,539,777 B1 * | 4/2003 | Ashworth et al. | 73/49.1 |
| 2003/0033855 A1 | 2/2003 | Manger et al. | 73/49.2 |

* cited by examiner

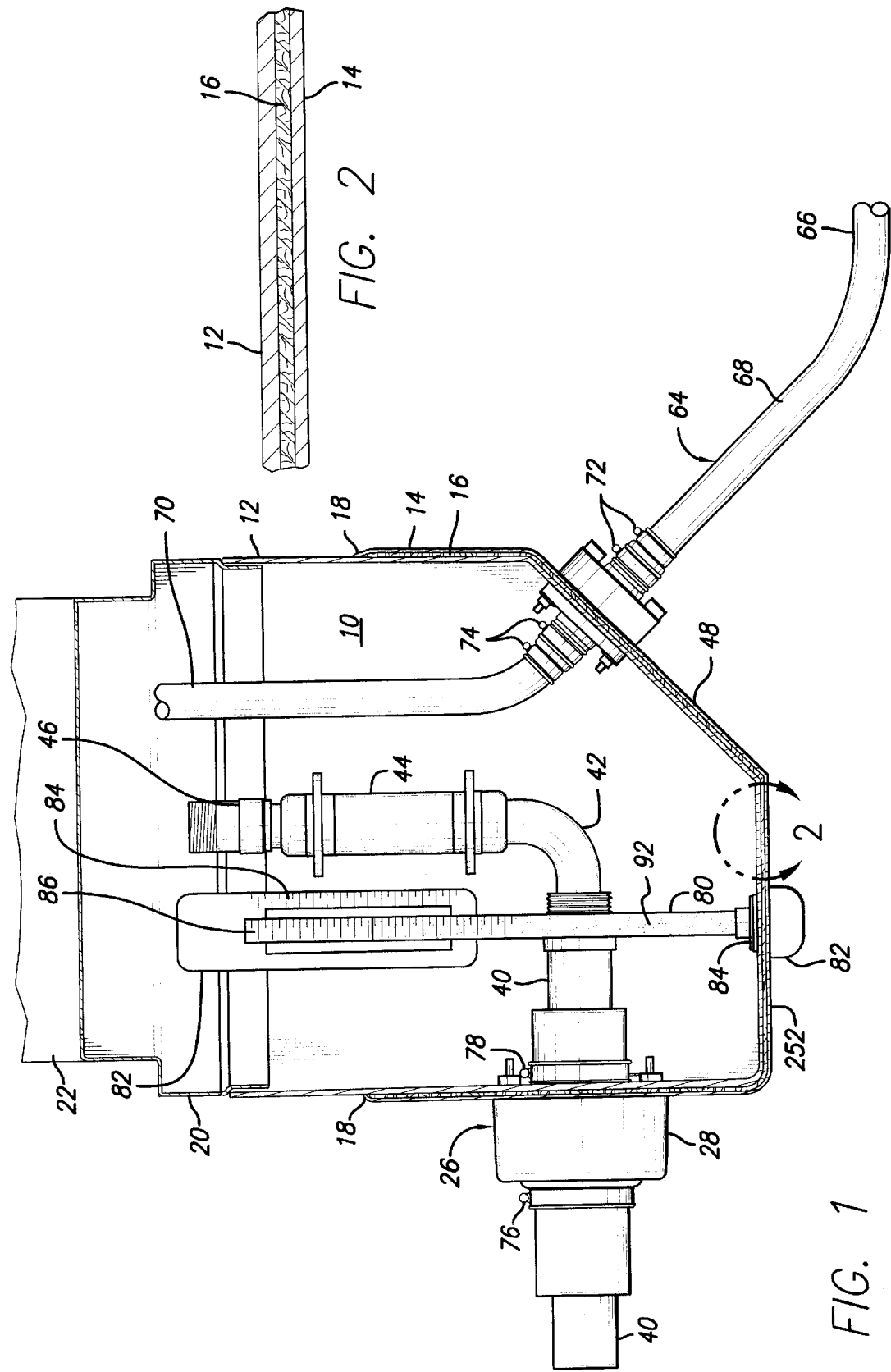

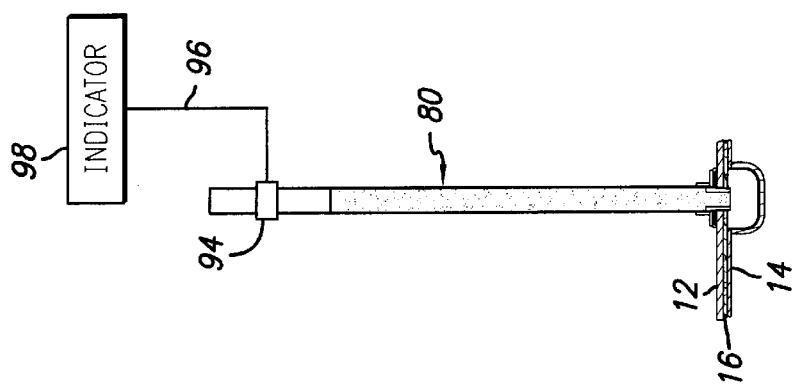
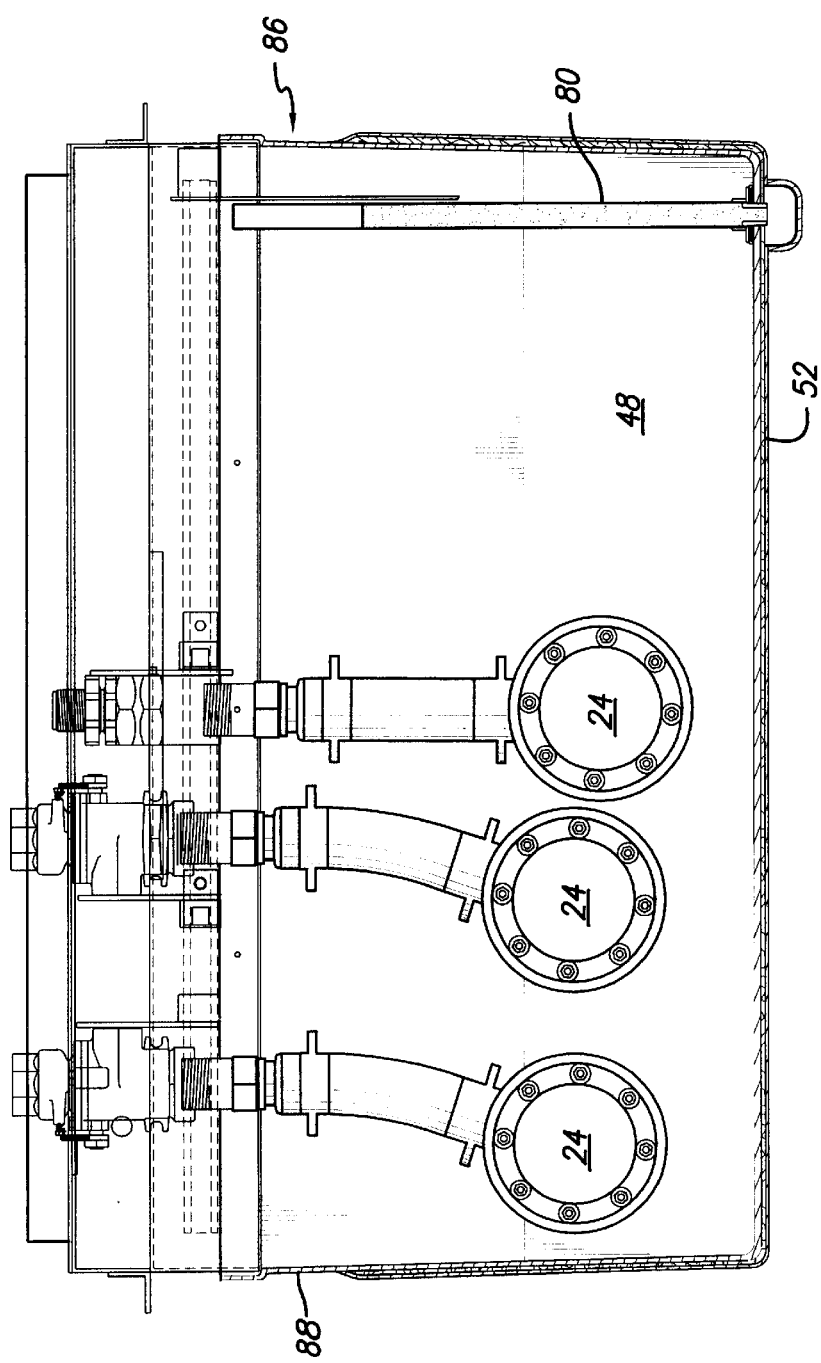
FIG. 7
FIG. 8

DISPENSER CONTAINMENT

RELATED APPLICATION

This application relates to U.S. patent application Ser. No. 09/951,590, entitled "CONTAINMENT FOR DISPENSERS", filed contemporaneously with this application. The contents of that application are incorporated by reference herein.

BACKGROUND OF THE INVENTION

This invention relates to sumps to contain leakages. In particular the invention is directed to containing leakages of toxic liquids, such as petroleum or other oil based products. A particular application of the technology of the invention relates to protecting the environment from gasoline spills at locations where consumers obtain gasoline at dispensers, pumps and the like.

Current requirements are for periodic testing of leakage around gasoline dispensers at consumer gasoline stations. This means that leakage could occur in between the periods of testing thereby increasing the oil company's potential liabilities. A reason why current dispenser containment designs can not be tested continuously is because the inside of a dispenser containment box or sump can not be filled with liquid. The liquid would most likely rust the many components inside the box, and the regulatory agencies do not allow standing fluid and the manufacturers do not allow for the kind of weight that would expose the dispenser sump.

Visual inspections to see whether the dispenser sump is leaking is impossible. Also it is desirable to change to requiring a higher form of secondary containment and/or monitoring of liquid. A pipe containing the liquid is termed the first form of containment and the wall of the sump is called the second form of containment.

Presently there are no regulations that require a tertiary form of containment or a monitoring of the integrity of the secondary or tertiary form of containment. This may change if a product, method or system is introduced in the industry with a higher degrees of integrity and protection against leakage than the presently known and used systems, methods and products. The present invention is directed to providing that higher degree or level of containment.

Testing in California for gasoline station secondary systems is to be at initial installation, six months later and every 3 years thereafter. The problem that everyone in the industry faces is how to verify that the system is not leaking. If there is leakage, there is a need to easily trouble shoot to identify where the leakage problem is located. At initial installation of a sump with dispenser, testing is easily accomplished by visually inspecting the box from the outside prior to cementing over the entire job-site. The problem now faced by the industry, as a whole is how do you test secondary containment as simply, reliably without major cost to the end user.

The most commonly used method in the industry is to test the dispenser containment with water filling the containment sump up and utilizing very sensitive float sensors to speed up the test. This involves filling a dispenser sump up with as much as 50 to 60 gallons of water. Should a leak be found the most time consuming issue is then locating the leak that can not be viewed from the outside of the sump since the containment unit is buried in under concrete. Finding and repairing a leak is the most time consuming and costly part of the tests. In addition, the water used must then be removed and treated as a hazardous material adding to the cost and complicates the process of testing.

Other methods of testing that have been considered were vacuum and pressure testing of dispenser containment which are not practical in dispenser containment because of the pipe extending upwards through the opening within the dispenser. The only way to pressurize a conventional dispenser sump is to remove the dispenser which costs over $1,000 per dispenser and the shutdown of the station.

Unlike dispenser sumps, tank sumps can be tested under vacuum and pressure because every part contained within a tank sump can be covered without cost. The test is subject to a much more stringent requirement since air can find much smaller leaks involving electrical wiring leaks and smaller cracks in the sump or its accessories. Air testing usually results in finding leaks in areas that are typically not required to tested by regulators.

The present invention is directed to providing a tertiary form of containment and/or providing a simplified means of monitoring substantially easily and/or relatively continuously the second form of containment.

Another issue relating to sumps, revolves around the need for the piping containing electrical lines into a hazardous material area to be buried 24" below a concrete surface and the pipe must be made of a continuous run or rigid steel conduit. As a result, the electrical fittings are the most commonly damaged fitting. Even flexible fittings are often bent beyond the recommended entry angle 15 degrees maximum.

Typically, the worst situation is when an electrician needs to run conduit to the side closest to inside of a dispenser containment wall. In addition, a typical 90 degrees minimum bend radius may only be 8 inches. To compensate for inability to bring an electrical conduit close to the wall the electrical contractor often over-loops the conduit by 110 degrees and return it back by 20 degrees to align the conduit with the dispenser above the sump. This typically is a very inaccurate method, which then leads the electrical contractor to abuse the penetration fitting to compensate. This leads to failure of a fitting. An easier method would be to bring the conduit through the bottom of the sump as in shallow pans, which alleviate stress to the fittings. However, this also leaves the fitting on a bottom of a sump exposed to fuels that may breakdown the seals leading to an earlier failure.

The invention is also directed to having an improved technique for passing piping and conduits into and through a sump wall and to retain integrity and alignment with a dispenser above the sump.

These objects and other objects of the invention are achieved by the invention in the manner set out below.

SUMMARY OF THE INVENTION

According to the invention, there is provided a sump for inhibiting leakage of liquid contained therein. There is a double wall for at least part of the sump. The sump defines a cavity for containing liquid. There is an interstitial space between the double wall. An indicator liquid is located in the space.

A sensor is in fluid communication with the interstitial space such that a change in the pressure or liquid level in the interstitial space causes the sensor to indicate leakage into or from the interstitial space.

Also according to the invention the sump includes a base, and a wall directed upwardly from the base of the sump towards the top, thereby forming a cavity for liquid.

An angular portion of the upwardly directed wall is directed at an angle from the base greater than 90 degrees and a remote location of that angular portion is connected with an upright wall to the sump.

According to the invention there is provided a system of dispenser containment utilizing a primary, namely an inner, and a secondary, namely an outer, wall. An interstitial space between the two walls traps an interstitial fluid to test the integrity of the dispenser containment and the fittings that pass through the walls.

Preferably a minimized quantity of fluid is located in the interstitial space. This is achieved by retaining the interstitial space as relatively small as possible. This makes the change in the liquid level in the space enhance changes in the level to find small leaks quickly.

In large dispenser sumps 1/10 of a gallon change allows one to visually see a change of 1" in the level of a manometer or electronic sensor associated in fluid connection with liquid in the interstitial space. The interstitial test fluid is permanently left inside the interstitial space thereby eliminating the need and cost to treat hazardous material cost and virtually eliminating the dispenser containment tests.

Preferably, a manometer is employed. The manometer can be used to identify the height at which a leak can occur. This reduces the time to trouble shoot. The manometer can be used to measure small volume changes either visually or through electronic float sensors. The visual inspections are performed without the introduction of any water inside of the dispenser sump. The manometer can permit for visual or electronic monitoring on an intermittent basis or on a continuously basis. Manometers are also preferred because the amount hydraulic pressure is relatively limited by the height over the lowest point.

The manometer is removable because the manometer may be damaged and require to be replaced. Plastic is a preferred material because if during the installation a pipe wrench hit the tubing, the manometer may break before causing damage to the more expensive containment sump.

The manometer placement at the lower part of the sump is preferred. Testing of the sump with air pressure or vacuum or even helium requires the interstitial fluid must be removed first from the lowest point in the dispenser containment interstitial. Once removed, the alternative tests are helpful in pinpointing leaks within the sump.

The secondary wall, namely the outer wall, also allows relatively easier trouble shooting using a variety of methods such as manometer measurement, or pressure/vacuum or helium measurement.

Should a sump box leak somewhere on the outside it is likely there was no release of gasoline to the ground because of the redundant seals in a double wall dispenser containment. Repair to dispenser sump's fittings is a common problem and is easily repaired inside dispenser containment with the present invention.

Brine or Propylene Glycol solution is the preferred interstitial fluid because of the reduced likelihood of damaging effects of liquid freezing, namely expanding, within the interstitial of double wall dispenser containment and it is non-toxic. When filling the dispenser containment with brine solution as purging air from the upper extremity is effected. A breathing hole allows air to escape and allows the brine to completely fill the interstitial space. The purging of air prevents volume fluctuations due to air temperature fluctuations. This helps minimize false alarms especially on double wall dispenser containment with electronic level detectors.

A breather hole may need to be open because it will show leakage better. In other cases, the hole is closed to ensure a more redundantly sealed system.

The configuration of container on the sump box with an angular portion has an internal angular relationship with adjacent walls on either side of about 135 degrees and has advantages. This degrees relationship is akin to an outside angular relationship of 45 degrees angle at the bottom of the sump box and the upright of the sump box. This relationship has valuable beneficial advantages to an electrical contractor fitting electrical conductors and pipes in and through the sump box.

The foregoing and other objects, features, and advantages of the present invention will be apparent from the following detailed description of the preferred embodiments which makes reference to several drawing figures.

BRIEF DESCRIPTION OF THE DRAWINGS

FIG. 1 is a cross-sectional view of a sump illustrating the double wall interstitial space manometer connected with the interstitial space, the gas line or pipe in and out of the sump and the electrical conduit in and out of the sump.

FIG. 2 is an enlarged sectional view showing the double wall and the interstitial space.

FIG. 7 is a representation of an interstitial wall fluidly connected with a column and having a sensor in the column to determine variations of liquid pressure or volume in the interstitial space, the sensor being connected with an indicator.

FIG. 8 is a cross-sectional side view of the sump showing the interstitial wall, three parts for three different gas lines to enter the sump, and a manometer located at one end of the sump.

DETAILED DESCRIPTION OF THE PREFERRED EMBODIMENT

Figure 3:
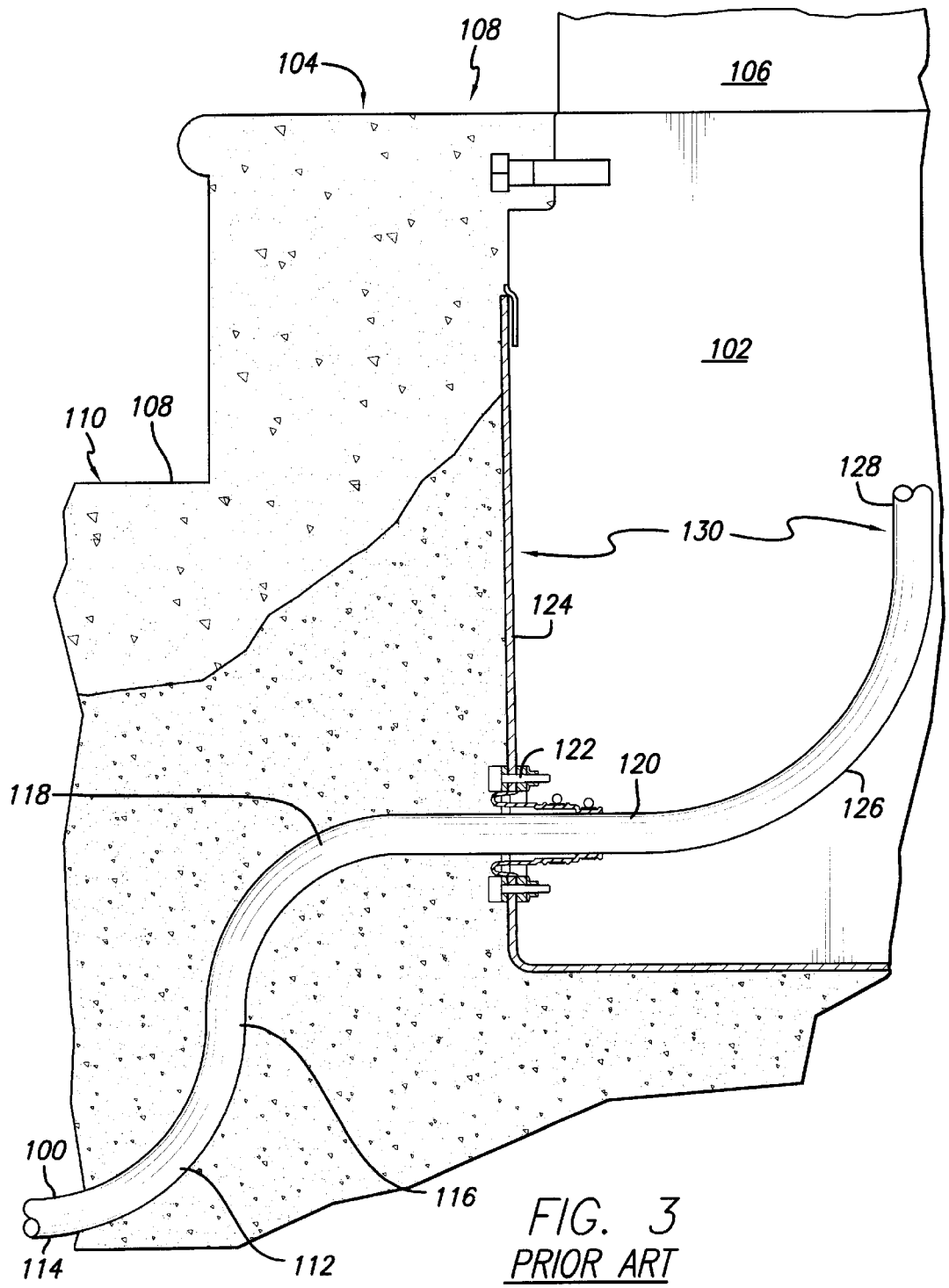
FIG. 3 is a prior art representation of a sump embedded in concrete, the sump being single walled and having an electrical conduit arcing from outside the sump, through the sump and into the body of the sump.

In the following description of the preferred embodiments reference is made to the accompanying drawings which form the part thereof, and in which are shown by way of illustration of specific embodiments in which the invention may be practiced. It is to be understood that other embodiments may be utilized and structural and functional changes may be made without departing from the scope of the present invention.

A sump for inhibiting leakage of liquid contained therein comprises a double wall for at least part of the sump. The sump defines a cavity for containing liquid. There is an interstitial space between the double wall and there is a fluid in the interstitial space. A sensor is in fluid communication with the fluid in the interstitial space such that a change in the condition of the fluid in the interstitial space causes the sensor to indicate leakage into or from the interstitial space.

There are means for locating a gasoline dispenser above the sump, the sump being for containing liquid leaking from at least one of the dispenser or a pipe directed from a source of gasoline to the gasoline dispenser and the pipe being directed at least partly through the sump in its connection between the source and the dispenser.

The sensor is a manometer, and the manometer is selectively mounted in the cavity within an inner wall of the double walls and wherein the manometer is in fluid communication with the interstitial space. An indictor fluid is a liquid, and the indicator liquid is preferably brine, the brine being selectively colored. The brine extends from the interstitial space into a manometer. The manometer is mounted at the base of the sump and is directed substantially vertically within the sump, and the manometer includes a substantially transparent column whereby the brine level can be sensed.

There is a measure mounted in adjacency with the manometer column such that changes in the liquid level in the manometer can be detected against a measuring scale. The manometer is separable from the sump, separation being effected by releasing a mounting element. The mounting element is located with the base of the sump and extends between an inner wall through the interstitial space and to an outer wall of the sump. The manometer column is made of plastic.

The interstitial space is retained relatively small thereby to permit a relatively small quantity of interstitial fluid to be contained therein such that relatively small changes in fluid condition in the interstitial space. Such changes are affected either by the ingress of fluid from the cavity through an inner wall to the interstitial space or the egress of fluid from an outer wall to an area surrounding the outer wall. This makes it relatively easily detected by changes reflected in the manometer.

The interstitial space includes bridges, the bridges selectively being formed by fiberglass and the bridges acting to provide enhanced strength collectively to inner and outer walls of the sump. The outer wall of the interstitial space extends in height up at least up to one-half the height of an inner wall of the sump. The outer wall extends to a height above the level of a fitting for located tubing passing through the outer wall and the inner wall of the sump wall.

A breathing hole can be located towards the upper limit of the interstitial space, the breathing hole permitting purging of air relative to the interstitial space, thereby to minimize volume fluctuations in fluid level in the interstitial space due to temperature differences.

The double wall includes a base, a wall directed upwardly from the base of the sump towards the top thereby forming a cavity for liquid, and the upwardly directed wall includes an angular portion being directed at an angle from the base greater than 90 degrees relative to the base and a remote location of that portion being connected with a substantially upright wall portion for the sump. The angular portion extending between the base and the substantially upright wall portion extends at about 135 degrees relative to the base and at about 135 degrees relative to an upright wall of the sump. The sump is essentially four sided, namely a base, a first upright wall, a second upright wall, and the angular portion between the base and one of the upright walls.

There is an aperture through the angular portion. The aperture includes a fitting for receiving a conduit, the conduit being directed substantially at right angles to the angular portion. The conduit includes a bend within the sump, the bend being for directing the conduit substantially upwardly and parallel to a upright wall of the sump. There is also a bend in the conduit in a position removed from the fitting and outwardly located relative to the sump such that the conduit portion after the bend is directed substantially parallel to the base of the sump. The bend in the conduit in a position removed from the fitting and outwardly located relative to the sump is such that the conduit is directed substantially parallel to the base of the sump. The conduit is integral and continuous between a position removed from the sump and crosses through an aperture in the sump and upwardly in the sump.

The cross section of the sump viewed from the top is substantially rectangular. An end view of the sump includes a substantially horizontal top, a vertical side wall, the base extending substantially parallel to the top and for a distance partially equal to the distance of the top. The angular portion extends upwardly to a line about equal to the end of the top, and there is a vertically directed relatively shorter upwardly directed wall extending between the end of the top and the end of the angular portion remote from the base.

There is at least one aperture in the upright wall. The aperture is to receive a pipe containing fluid and for directing the pipe through the sump wall and upwardly to a position above the sump, the upright wall being the wall not directly connected to the angular portion of the sump.

There is also an aperture in the angular portion, the aperture being in a position relatively closer to the upright wall connected to the angular portion than to the position of joinder of the angular portion with the base.

The sump includes a mouth at the top, the mouth being for receiving a gasoline dispenser and means for passage through the sump of one or more pipes connecting the gasoline dispenser with the environment outside of the sump. One pipe is for directing gasoline from an environment outside of the sump through the sump and to the dispenser and including a conduit for directing electrical conductors from an environment outside of the sump through the sump to the dispenser.

The electrical conduit includes a vertically directed portion, a portion angled at about 135 degrees relative to the vertical portion and passing through an aperture in the angular portion of the sump, and a further bend in the conduit of about 135 degrees at a position remote and outside of the sump, the conduit being for directing electrical conductors from outside of the sump through the sump and above the sump.

A sump 10 for inhibiting the leakage of liquid from the sump includes an inner wall 12 and an outer wall 14. Between these walls 12 and 14 there is an interstitial spatial member 16. The outer wall 14 can be formed of a suitable metal. The inner wall 12 can be of a fiberglass or other material or vice versa or both can be of fiberglass or other suitable synthetic material. The interstitial space 16 forms bridges of fiberglass between the walls 12 and 14 and thereby provides extra reinforcing to the walls such that pressure or vacuum applied to the inside of the sump on wall 12 or pressure or vacuum applied on the outside of wall 12 or the outside of wall 16 reacts against the interstitial space. The topmost portion of wall 12 above the joined a part 18 between the two walls acts to receive a fitting 20 for receiving a dispenser 22. The dispenser 22 can be for receiving gasoline from a central reservoir and dispensing that to vehicles.

Figure 5:
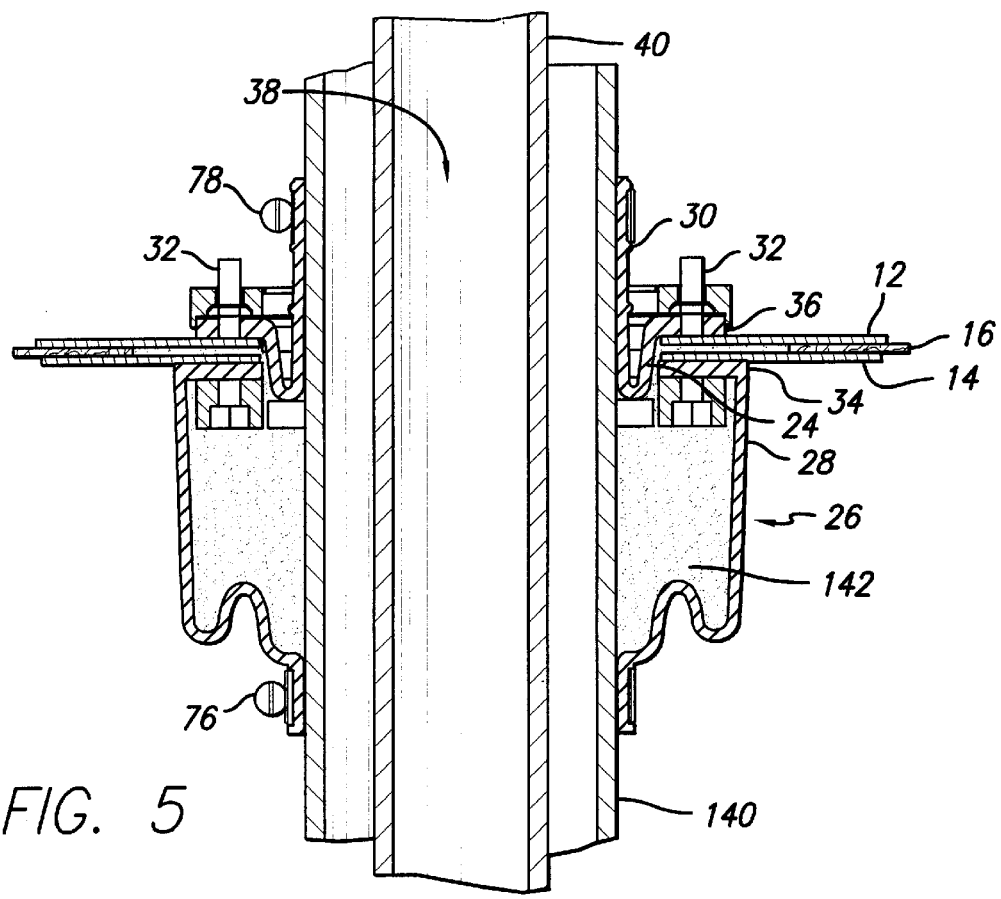
FIG. 5 is a representation of a fitting passing through the double wall of a sump, the fitting being for receiving a gas line.
Figure 6:
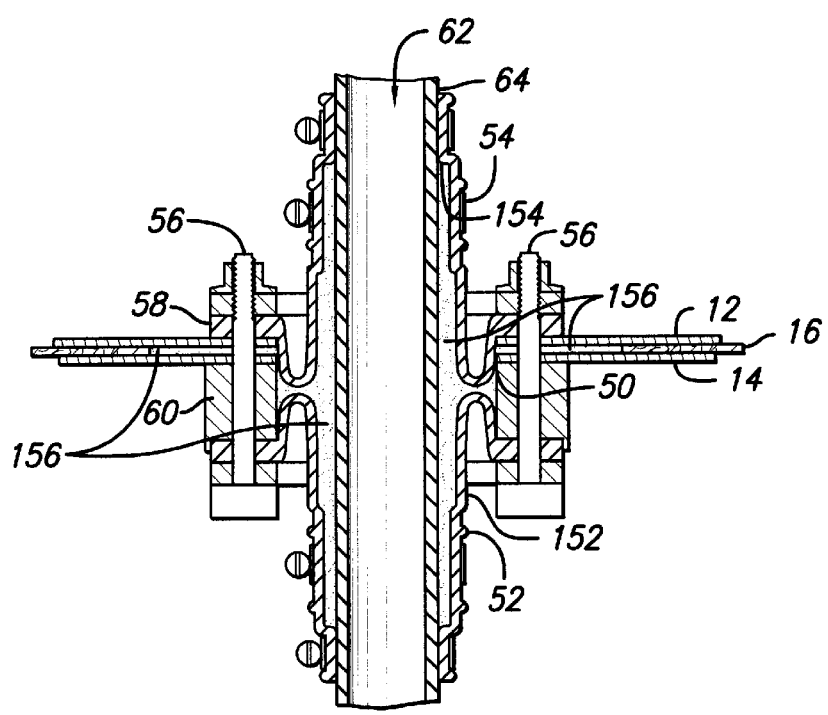
FIG. 6 is a cross-sectional representation of a fitting passing through a double wall sump, the fitting being for passage of an electrical conduit.

With reference to FIG. 5, they can be seen in aperture 24 in the walls 12 interstitial space 16 and wall 14. The aperture 24 receives a fitting 26 which has an outside component 28 and an internal component 30. The outside component 28 and internal component 30 are joined together by means of multiple walls which are arranged circumferentially around the aperture 24. The bolts 32 pass through apertures formed around the main aperture 24. Tightening of the bolts 32 causes the fittings 26 and 30 to be drawn tightly together and thus form an effective seal around the aperture 24. The members 26 and 30 have lateral flange-like elements 34 and 36, respectively, to affect the seal against the outer wall 14 and the inner wall 12 as indicated. Through the bore 38 passes a gasoline pipe 40. The gasoline pipe 40 is directed transversely or horizontally as shown in FIG. 1. Around the outside of the pipe 40 there is another secondary pipe 140 which is engagement with the seals 34 and 36. Between the inside of the fitting 26 and the outside of the pipe 40 there is communication with the interstitial space 16 so that fluid from the space 16 fills that space 142. Thus leakage in the seals 34 and 36 can be determined by changes in the interstitial space 16.

There is an elbow 42 within the sump 10 which turns the gasoline pipe upwardly and this is connected with a flexible coupling 44 which is in turn connected to an upwardly directed pipe 46 which exits the fitting 20 and is directed towards the dispenser 22.

On a different wall of the sump 10, namely an angular projection wall 48 there is a second aperture 50. The left-hand wall 18 is connected with a base portion 252 which is then angularly connected at about 135 degrees with the angular projection 48 of the sump 10. The end remote from the base 52 of the angular portion 48 is connected with the upright wall on the right-hand side of the sump. The angular interior engagement of the right-hand upwardly directed wall and the angular portion 48 is also about 135 degrees.

The aperture 50 is located in the angular portion 48 at a position closer to the right-hand upwardly directed wall of the sump. In this fashion, the aperture 24 is fairly far removed from the aperture 50, but still at a location sufficient that the apertures can receive the appropriate conduits or pipes or fittings.

Figure 10:
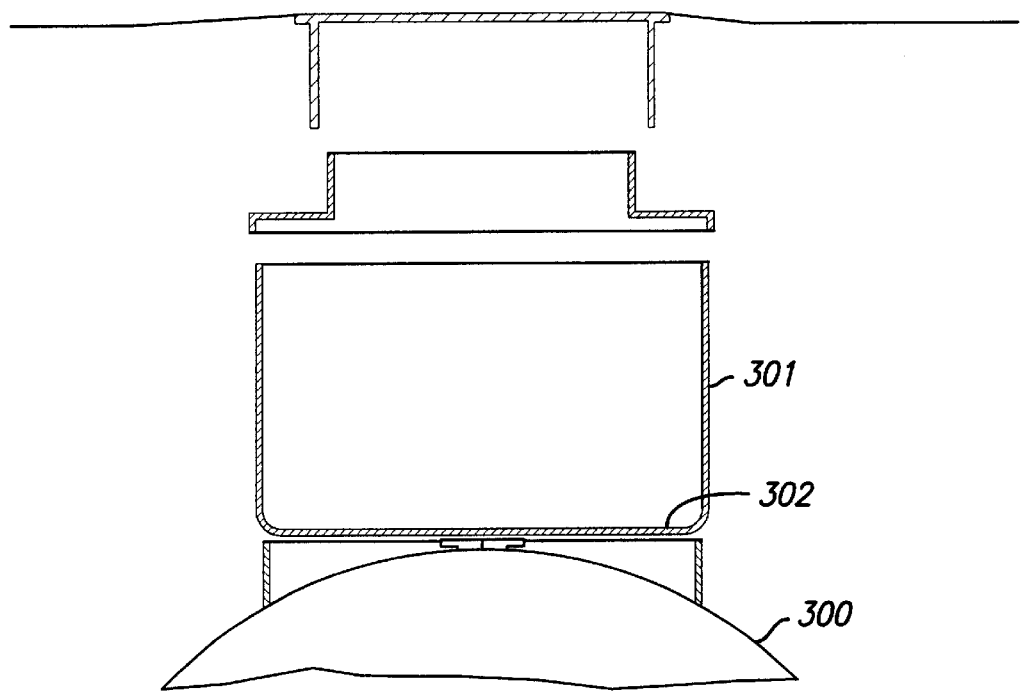
FIG. 10 is a cross-sectional view of a tank sump according to the prior art.

As described in the embodiment, the sump is shown with the aperture 24 in the left-hand wall and the aperture 50 in the angular portion. In other embodiments, the mirror arrangement can be provided such that the right-hand wall can be the elongated wall, the base 252 can extend transversely and the angular portion 48 can be directed from the base to a shorter left-hand wall. This would depend on different configurations. In yet other forms of the invention instead of the substantially right angular configuration illustrated different shapes of sump can be provided. As shown in FIG. 10, the cross section of the sump 10 from the top is substantially right angular. In other configurations, the sump could be substantially circular.

While the specification describes particular embodiments of the present invention, those of ordinary skill can devise variations of the present invention without departing from the inventive concept.

The aperture 50 receives a two-component fitting 52 and 54. The component fitting 52 is located adjacent to the outside wall 14 and the component fitting 54 is located adjacent to the inside wall 14. The interstitial space is located between the walls 12 and 14. An array of walls 56 are located circumferentially around the aperture 50 and typing done off the balls causes the components 52 and 54 to be pulled together and thereby effect a seal with sealing portions 58 and 60 which are respectively pulled tight adjacent to the inside wall 12 and the outside wall 14 of the sump. A bolt 62 is located through the fitting 52 and 54 and this receives in a tight relationship a conduit 64. The conduit 64 includes an inlet portion 66 which is substantially horizontally directed a portion 68 which is substantially bent to be 135 degrees relative to the line of the inlet portion 66 and a portion 70 which is also at about 135 degrees relative to the line of the conduit 68. With this construct conduit portion 68 penetrates the aperture 50 substantially at right angles to the aperture. The fitting 52 and 54 have circular clips 72 externally and 74 internally which secures tightly the conduit portion 68 with the fitting 52, 54 so that no leakage can occur between the sump 10 and the external portion through the fittings 52, 54.

The fitting 52 and 54 has raised shoulders 152 and 154 which are not in contact with the conduit 64. Interstitial fluid from the interstitial space 16 can enter the space 156 formed by the shoulders 152 and 154. The space 156 also extends in part between the fittings 52 and 54.

Similarly, the pipe 40 for gasoline which passes through the fitting 26 has one or more circular clips 74 on the outside and 78 on the inside for sealingly engaging the conduit 40 such that no leakage can occur between the conduit 40 through the fitting 26.

With this configuration, the upright portion 70 of the conduit 64 is retained relatively close to the right-hand upward wall 12 and is as far removed as relatively possible from the gasoline conduits 40, 42, 44 and 46. The relationship of the portion 68 penetrating the fitting 52 and 54 in a right angular fashion is arranged so that no undue pressure is placed due to angular displacement on the members of the fitting 52 and 54. Thus, there is no impairment of the sealing quantities of the fitting 52 and 54.

Mounted on the base portion 252 of the sump is a manometer column 80 which is in fluid communication with the interstitial space 16. A suitable anchorage 82 below the base portion 252 which cooperates with a mounting ring 84 affects positive location of the manometer on the base 252 of the sump. The manometer column 80 is a sealed glass or plastic container and as such as responsive to the changes in liquid level in the interstitial space in a manner which is more fully described below. Mounted towards the upper portion of the manometer column 80 is a scale or reading element 84 which has a rule or measure 18 which is substantially directed parallel to other measuring lines 86 at the top of the column 80.

Figure 9:
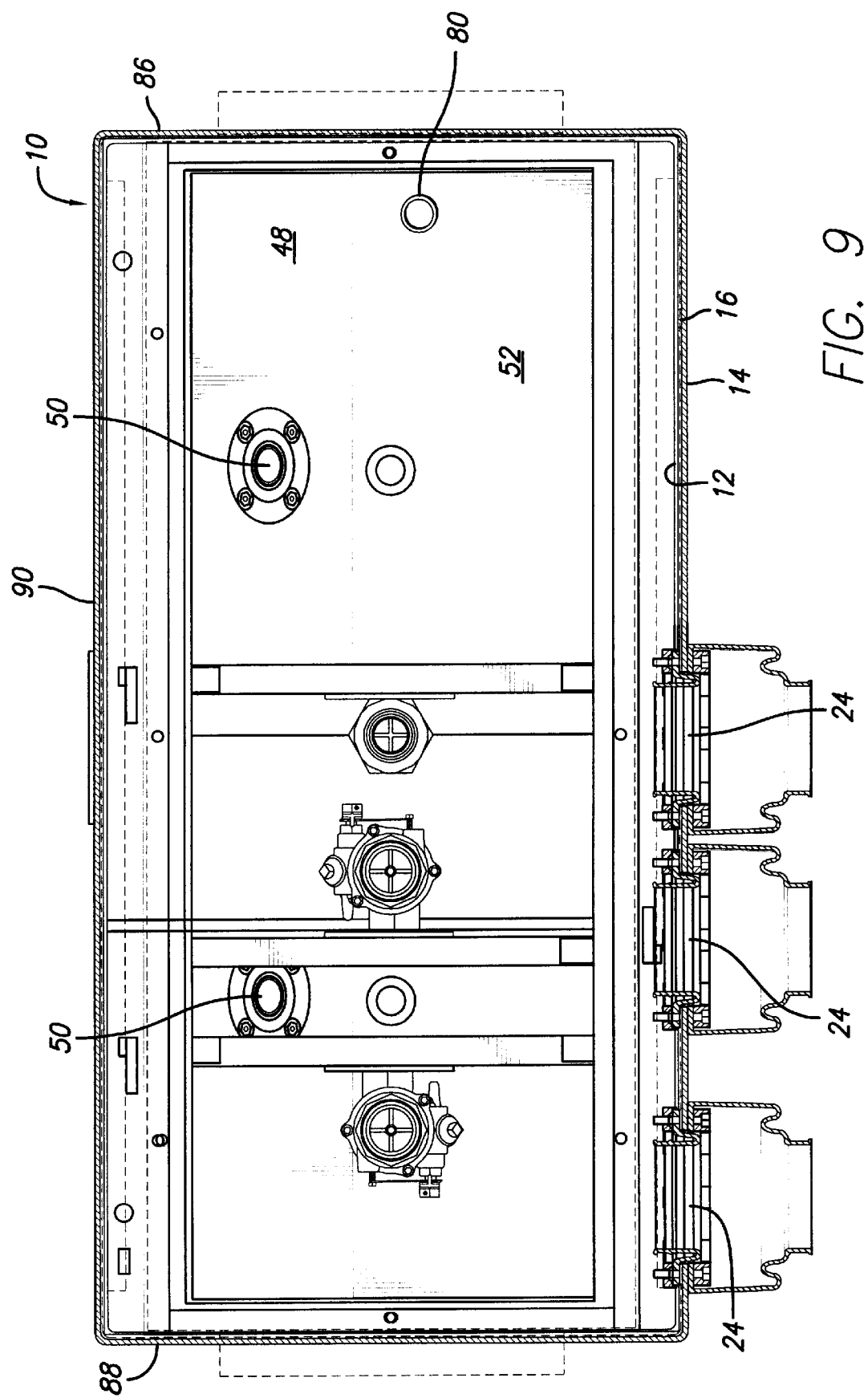
FIG. 9 is a cross-sectional view of the sump as viewed from the top showing three gasoline inlets, three gasoline outlets, and two apertures for receiving electrical conduits and a test manometer located toward one side of the sump.

As illustrated in FIGS. 8 and 9, the manometer column 80 is located towards the end wall 86 of the sump 10. The gasoline apertures 24 and their pipes and conduits are located towards the end wall 88 of the sump 10. The apertures 50 for the electrical conduit are spaced along the length 90 of the long walls of the sump such that each of the apertures is about ¼ of the distance from the ends 88 and 86, respectively.

The interstitial space 16 is filled with a brine fluid which enters the wall 92 of the column 80 and can be seen in FIG. 1. One or more apertures can be provided to the interstitial space to permit air to bleed from the interstitial space as necessary. Any leakage in the wall 12 into the interstitial space 16 or leakage in the wall 14 from the interstitial space causes the liquid level of the brine in the interstitial space to change. Those changes are reflected in the change in the height of the liquid in column 92 of the manometer 80. This can easily be read on the scale 84 of the manometer. The bleed holes would be located near the top of the interstitial space are necessary to remove air from the interstitial space. Once the interstitial is filled with fluid the variance of pressure or volume due to temperature change will be negligible so that changes in the level in the column 92 are not dependent on the temperature.

As illustrated in FIG. 7, there is a different configuration wherein the column 80 includes a sensor 94 which is electrically connected through line 96 with an indicator 98. This indication means permits for electronic sensing of the changes of the liquid level of pressure in the column 80.

Figure 4:
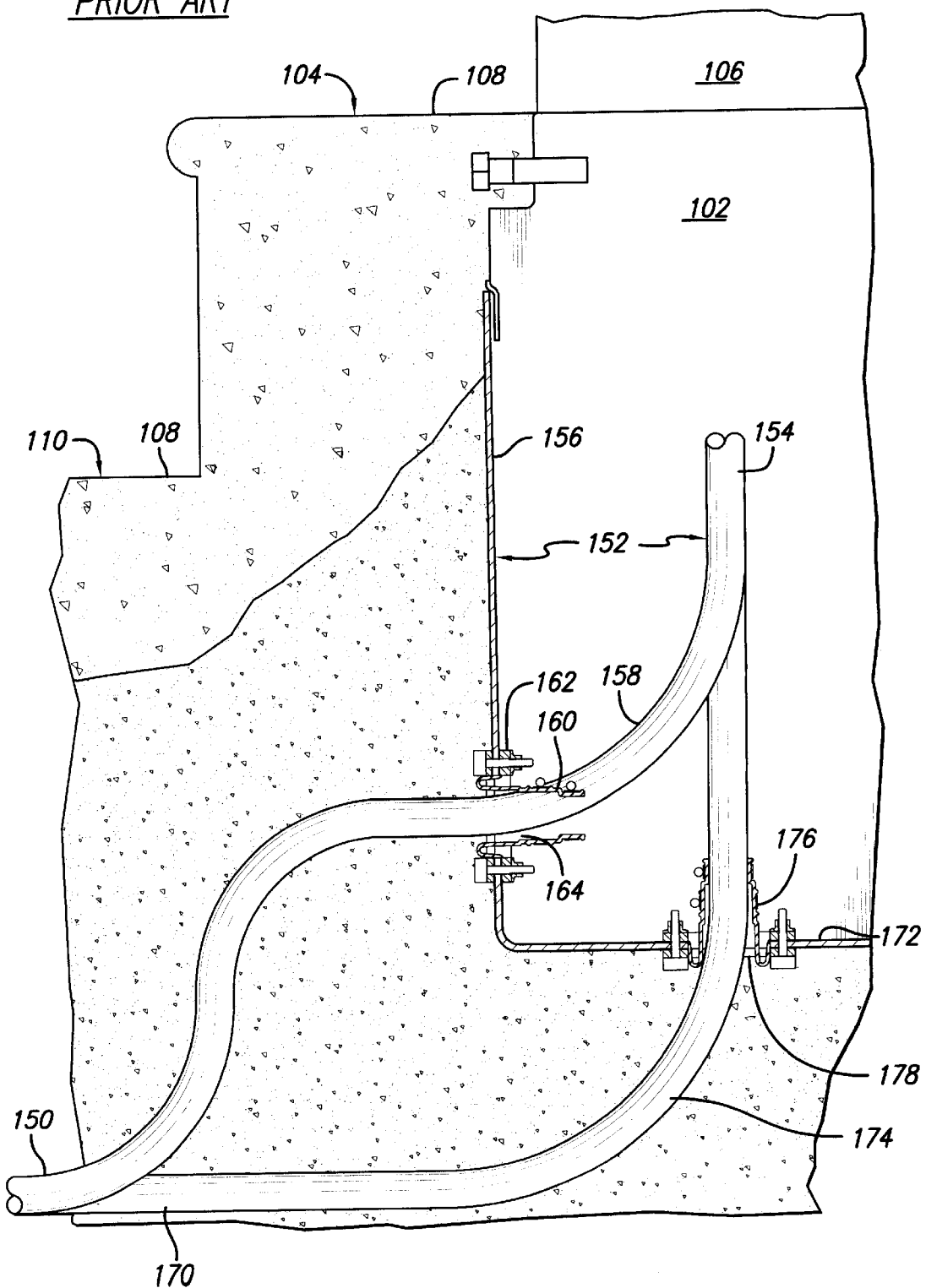
FIG. 4 is a cross-sectional view of a different prior art configuration of a sump buried in concrete, the sump being single walled, and having two other configurations of an electrical conduit entering the sump from outside, the conduit passing through a fitting and arcing upwardly in the sump.

The configuration for the electrical conduit 64 provides for a cleaner and more effective arrangement than prior art configurations. As illustrated in FIGS. 3 and 4, there are two prior art configurations for an elliptical conduit 100 entering a sump 102. A sump 102 is buried in a concrete island 104 which normally mounts a dispenser 106. The regulations require that the conduit be a fixed distance below the surface level 108 of the concrete or the road surface 110 or the top of the island 104. For this reason, the conduit 100 conventionally has a first 90 degrees angle 112 which turns the conduit from a horizontal direction 114 to a substantially perpendicular direction 116. There is a second bend 118 in the conduit to have a horizontal portion 120 which passes through a fitting 122 in the side wall 124 of the sump. There is then a further 90 degrees bend 126 in the conduit which then turns the conduit to be directed upwardly 128 in the sump. The fitting 122 in this configuration acts with integrity, however, the distance 130 between the upright portion 128 and the wall 124 is substantially extended longer than is ideal. This places the upright column 128 in the sump portion relatively too close to gasoline tanks. The requirements are that the conduit 100 be an integral member without any brakes such that there is safety in the electrical leads directed through the ball of the conduit 100.

In FIG. 4 there is a different prior art configuration which shows a conduit 150 being directed through substantially the same angular configuration as shown in FIG. 3. However, in order to keep the distance 152 at a minimum such that the upright portion 154 is closely located to the wall 156 the angular bend 158 is relatively more tightly configured. As illustrated in FIG. 4, the bend interacts with the end portion 160 of the fitting 162 with an interference effect. This causes the fitting portion 160 to be distorted and to be damaged and thereby not operate efficiently. Additionally as shown, there can be a space 164 between the electrical conduit 150 when it passes through the fitting 160. This is not a desirable configuration. And yet in no different prior art form there is a conduit 170 which transverses horizontally below the sump 102 and enters the sump through a base wall 172 after making a single right angular bend 174. While this configuration would be acceptable in the sense of preventing leakage between the fitting 176 and the conduit 174, it is undesirable to have the aperture 178 in the base 172 of the sump since this could promote leakage which otherwise would not occur if the aperture were not in the base.

The configuration as illustrated in FIG. 1 shows that the upright portion 70 of the electrical conduit is more closely related to the upright wall 12 and adequately spaced from the gasoline upright portions 44 and 46. Also, by having the appropriate bends in the conduit 64 the portion 68 passes at right angularly through the angular portion 48 so that the fitting 52 and 54 is not impaired or is maintained with integrity around the portion 68. The arrangement of having the angular portion 48 interact with the fittings 52 and 54 and the conduit 64 bent into the three portions 66, 68 and 70 in the manner illustrated in FIG. 1 permits for easy installation of the electrical conduit system in the sump in a manner which does not impact the integrity of the assembly and construct of the sump 10.

Many other examples of the invention exist each differing from the other in matters of details only. The invention is not to be limited by the preferred embodiment.

In some of the preferred embodiments, the fittings for receiving the gasoline pipes and electrical conduits are constructed partly of metal and/or flexible materials such as a suitable plastic or rubber. In other forms of the invention, the manometer column may be made of a more rigid material such as to be less breakable. A suitable seal is provided at the base of the manometer or other indicator of the liquid relationship in the interstitial space so as to provide integrity with the interstitial space and not permit leakage between the interstitial space and the manometer. The manometer may be located at different suitable positions inside the sump and in alternative configurations may be provided externally to the interstitial space or sump. In different forms of the invention, different configurations make up the interstitial space. Fiberglass is provided to form the reinforcing construct. In the interstitial space different formations may be provided. One or other or both of the walls of the sump can be formed of metal, fiberglass or other suitable material as required. Different sensor devices can be used to determine changes in the characteristics of the fluid in the interstitial space.

Moreover, different shapes of sump can be used and it can have applications in configurations unrelated to dispenses. Accordingly, the sump configuration can be used for determining the change of liquid in any reservoir and for this purpose, the interstitial space in at least part of a double wall configuration of the sump or reservoir can be used as part of the monitoring means when that interstitial space between the double wall of a reservoir is connected with a sensor to determine changes of liquid level or liquid condition in the interstitial space.

The double wall adds a redundancy protection against the release of petroleum products. In addition, the fiberglass process in the interstitial space bridges across the two walls to increase the wall strength. This strengthening of walls means less material per dispenser containment, and is a cost saving. Wall strength is beneficial in preventing the dispenser sump walls from deforming or cracking due to the loading from the back filling of the pea gravel. In addition, with this structural integrity one can also introduce pressure or vacuum to the two walls to check the integrity of the dispenser containment to quickly verify within the factory environment. Prior to this verification of sump tightness required filling dispenser sump with liquid which is a time consuming process.

The invented dispenser containment with two walls means the exterior is a form of tertiary containment. Where the primary wall is the pipe that carries product, the secondary is the inside wall and the tertiary wall is the exterior.

This double wall sump box allows one to know if a box is leaking. The continuous test lowers the risk of release to the environment perhaps saving oil companies from higher liability insurance. In tertiary containment with monitoring system one can actually know if one of the walls has been compromised. Prior to this containment it was unknown whether the containment box was liquid tight and if there was any release of petroleum product.

Monitoring can be integrated with the piping systems to create a single monitor system to check dispenser containment, piping systems and tank sump. The monitor can be placed in the dispenser containment because it is normally the highest point, hydraulically, on a piping system. The monitor of the various components of the system can be individual because testing or monitoring are easier to trouble shoot if the systems are independent.

Is it also possible to introduce other fluids into the interstitial space. Currently, most studies indicate some the contamination may be occurring under gasoline stations is happening through permeation. To prevent this a non-toxic additive to the brine or completely different fluid that breaks down harmful constituents of gasoline such as MTBE methyl-tert-Butyl-ether into biodegradable solutions or chemically bonds to make MTBE to large of a molecule to permeate through the fiberglass/plastic wall. The interstitial space can be utilized as the barrier or intermediary to prevent further contamination of soils. A double penetration fitting is required for a double wall dispenser containment.

The 45 degrees bottom allows the electrical fittings to be away from continuous exposure and allows an installer to run conduit on the same side of the box's entry fitting without stressing the fitting. The added benefit is the 45 sump bottom reduces the added bends to conduit that most deep boxes require. This reduction in bends reduces labor and allows one to run wiring easier through the conduits.

Although the invention is being described with regard to a sump which is normally located below ground level, the application of the invention could be with regard to sumps which are above ground and are for containing liquid. The height of the double wall of the sump can vary. In most cases, there is a double wall base with interstitial spaces and the interstitial spaces in the base are formed with fluid connection with interstitial spaces in the walls. In some cases, the base may be totally solid and the double walls with interstitial spaces can be otherwise bound or formed in a rigid anchoring means to the base. The double wall of the interstitial space on the walls alone in that embodiment is connected with the measuring means to determine the change of liquid condition and/or level in the interstitial space in the walls.

Figure 15:
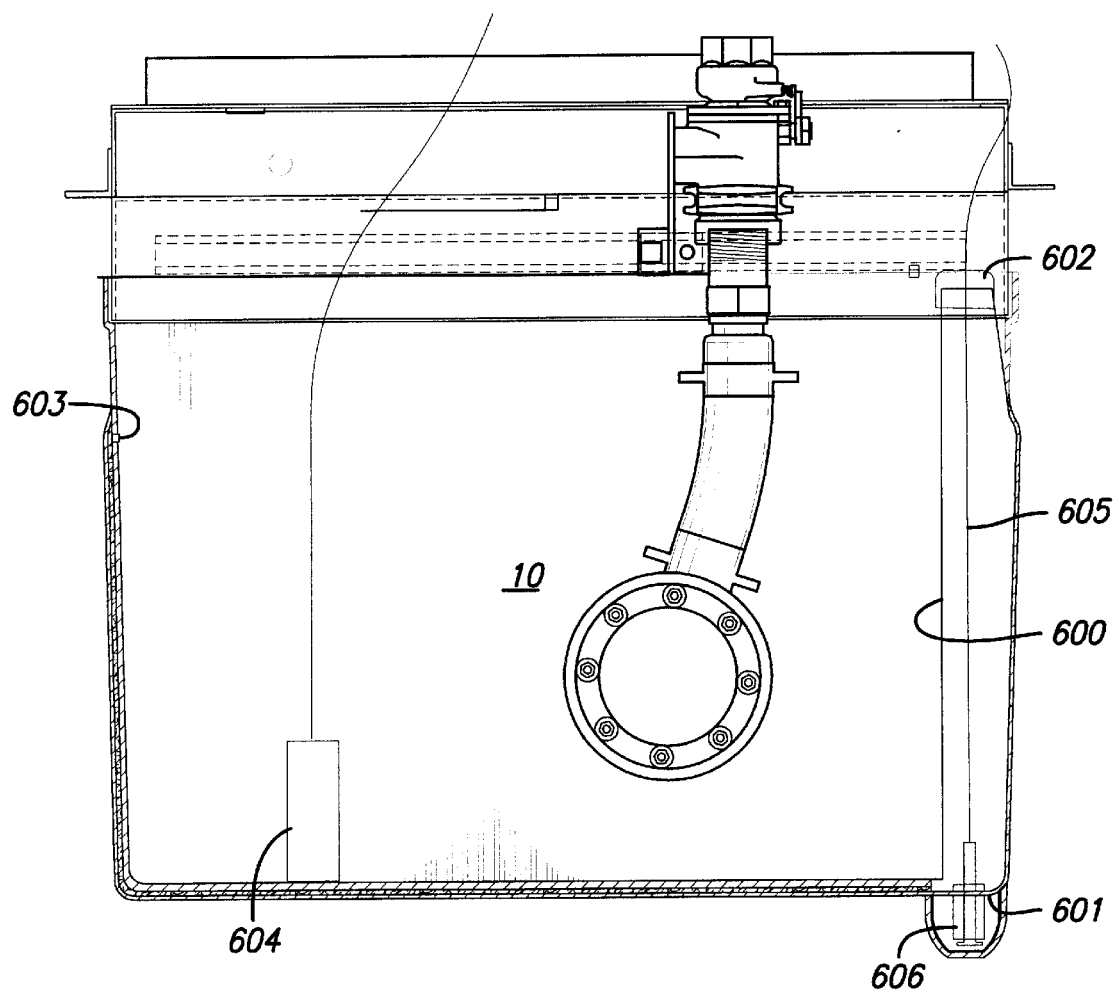
FIG. 15 is a different version of monitor with the sump.

The manometer 600 can manifest itself in other forms where the area to monitor can be void of interstitial fluid. This means actual fluid influx is necessary to detect problems. Since this method is at the lowest point 601 on the sump, this may be difficult to visually see. The manometer 600 may be an integral part of the sump forming the interstitial space and point of monitor, and a cap 602 can be used to ensure that elements associated with the manometer device 600 are kept essentially dry. As seen in FIG. 15 the air purge point 603 is towards the top of the interstitial space and is directed inwardly into the cavity 10. There can be an electronic sensor 604 for measuring any fluid changes in the cavity of the sump. Within the manometer type device, namely a device which has solid opaque walls there can be an electronic connection 605 to a remote module associated with an electronic float sensor 606 located at the low point in and/or about the sump. The integral monitor point may provide better protection against damage and an alternative means of testing/trouble shooting the secondary/tertiary without removing an interstitial fluid.

Figure 16:
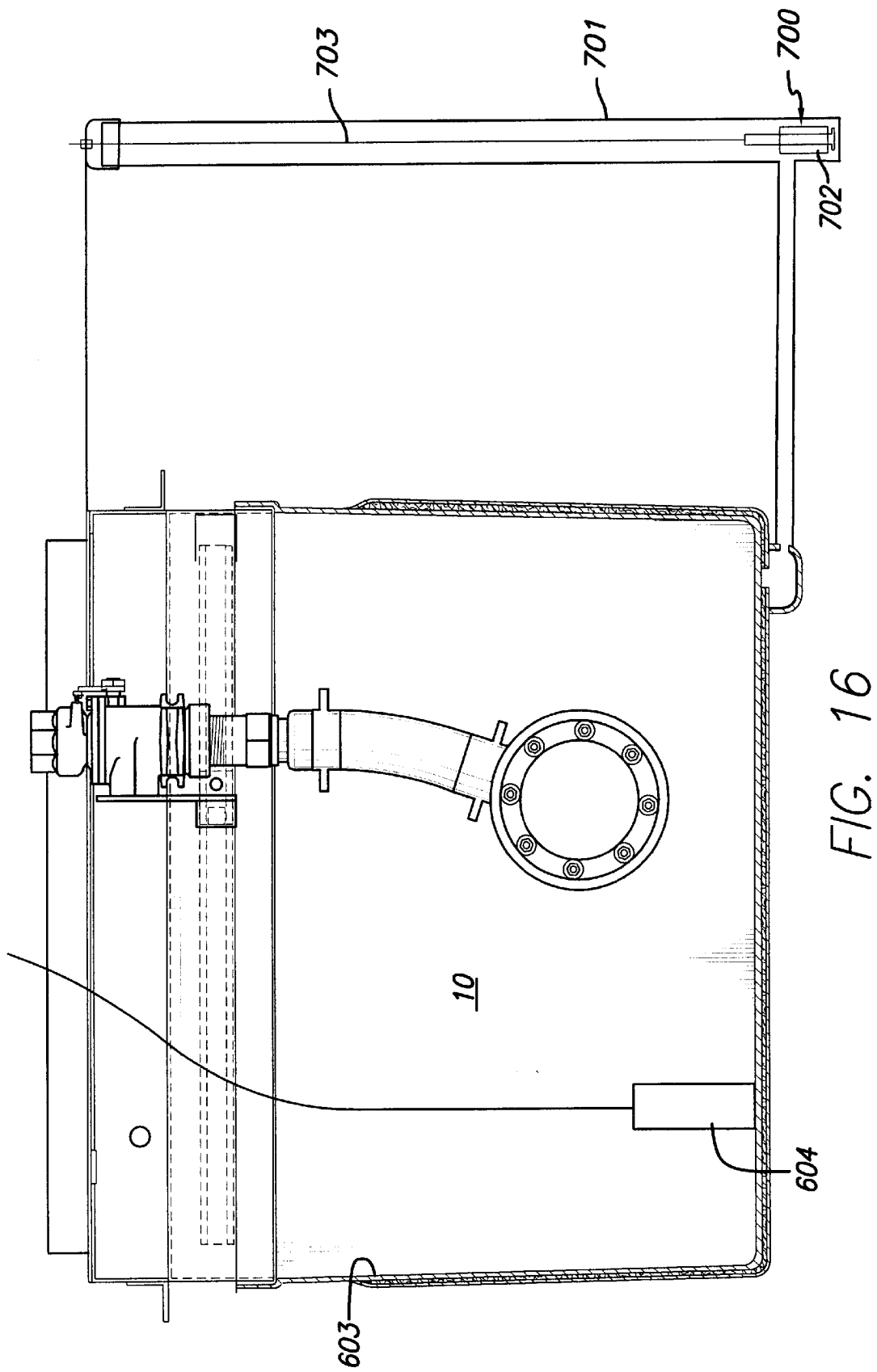
FIG. 16 is a version of monitor outside the sump.

Also the point of monitor may be completely exterior to the containment in order to provide remote access. There should be no interstitial fluid and a common low point from which a sensor must monitor that there is no fluid influx implying a possible release of product or water intrusion. This is shown further in FIG. 16, the sensor device 700, which can optionally be contained in a column 701, is retained dry under normal conditions, and any leakage is transmitted to the sensor 702, which then transmits a signal along line 703 to an electronic module.

The foregoing is a description of the preferred embodiments of the invention has been presented for the purposes of illustration and description. It is not intended to be exhaustive or to limit the invention to the precise form disclosed.

Many modifications and variations are possible in light of the above teaching.

In some cases there can be more components to the sump wall. There can be more angular portions. They can be located on different sides of the base. Each can have appropriate apertures. In some cases the sump so formed is used without the interstitial space and/or manometer measuring system. In other cases the interstitial spaces and/or manometer system can be used without the angular wall portion of the sump. The length of the angular portion can vary, and is preferably sufficiently long to accommodate the aperture and fitting and comfortably. The shortened upright portion is about the same length as the length of the angular portion.

The manufacturing of double wall dispenser containment was initially thought we would place a plastic mesh sandwich between to create an interstitial space between fiberglass walls. Other configurations are double wall plastic boxes. HDPE high-density polyethylene boxes can be made in a double-wall configuration in one mold component through a rotational molding process. These may be less expensive methods of manufacture.

Other testing methodologies are pressure and/or vacuum. However as already alluded to this can find leaks that may never occur under normal working conditions. Helium is a relatively expensive and specialized method of test.

The shapes or configurations to this double wall dispenser containment are limitless. The most typical are rectangular, however this concept can be readily applied to even cylindrical shapes that are typically applied to tank sumps.

The manufacturing of double wall dispenser containment uses a foam-core and/or fiberglass product to create the space between the two walls.

Figure 11:
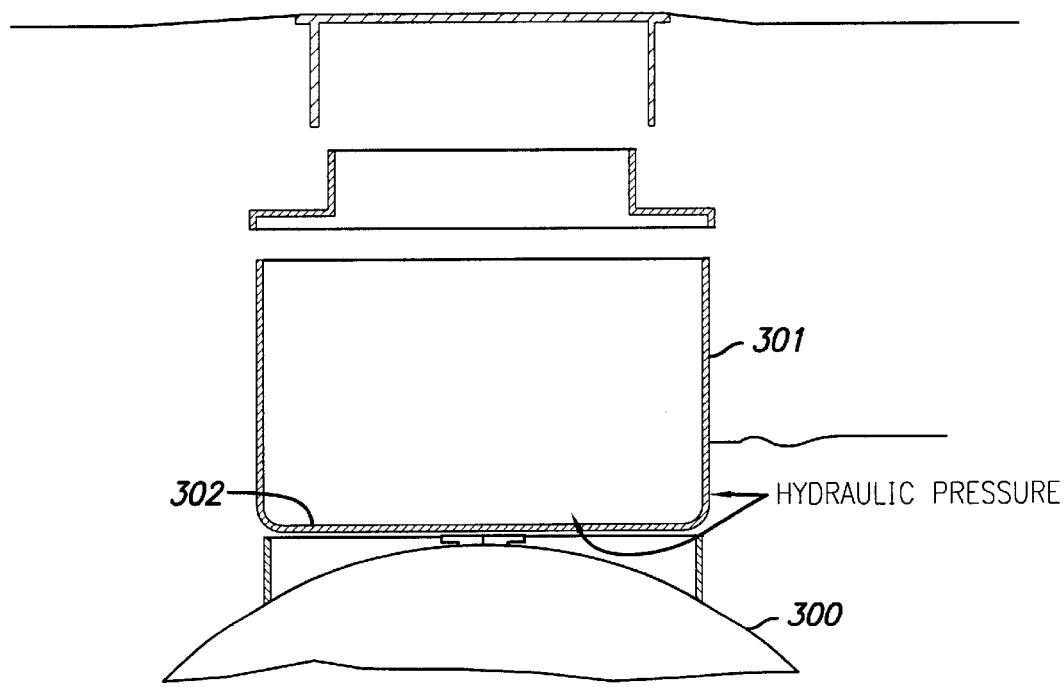
FIG. 11 is a cross-sectional view of a tank sump with a bottom for containment
Figure 12:
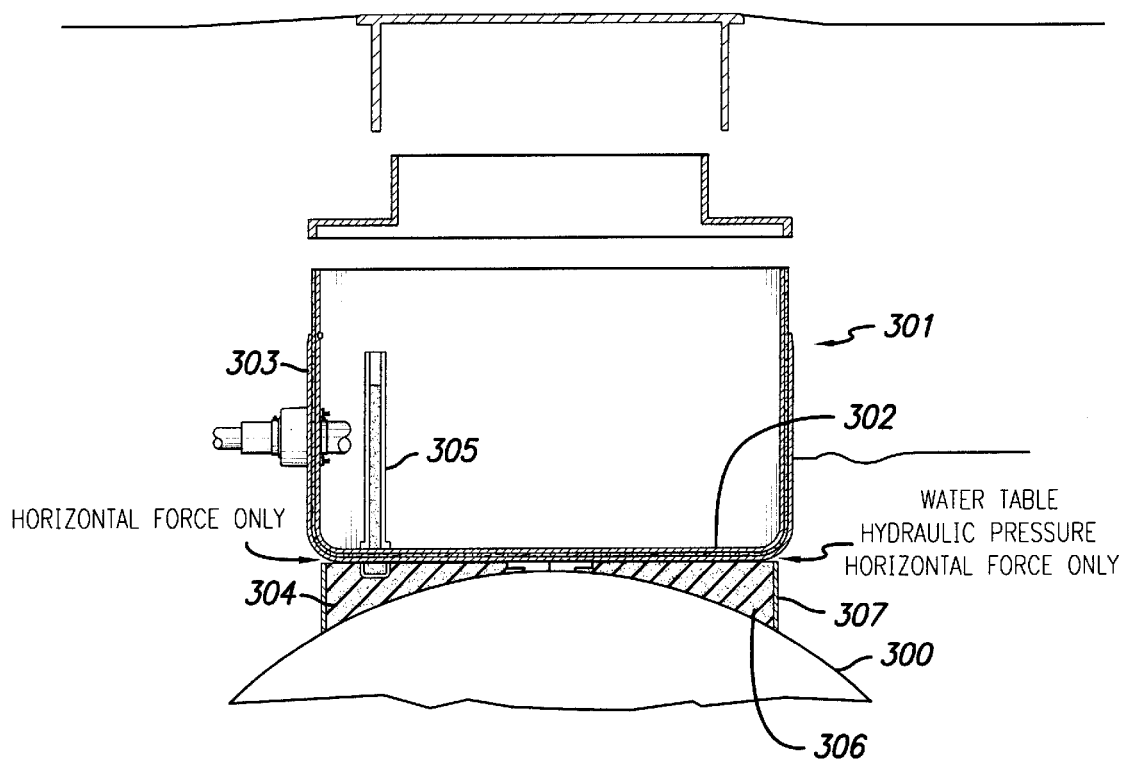
FIG. 12 is a cross-sectional view of a tank sump with a double wall and bottom and interstitial space for containment.

FIGS. 10-12 show tank sumps that typically consist of large diameter cylinders typically 42" and 48". These sumps 301, which work with tanks 300, consist of multiple fiberglass assemblies that require fiberglass field application to several of the sumps assemblies or as each section connects requires a separate assembly.

The invention provides for the use of sumps 301 with bottoms 302. The benefits of sumps having a bottom to the sump is to allow better integrity of the containment sump because the sump need not be fiberglass to tank for secondary containment. With a sump having a bottom 302, the bottom edge is sealed. This type of vessel may see high hydraulic forces. If the edges of a sump do not keep out all the water from getting under the tank sump the water pressure will seep under the bottom. Since the majority of installations of tank sumps 300 are performed in the field the conditions and installations lack the control that would ensure the bottom is sealed properly. This makes tanks sump walls and bottoms critical to handle large hydraulic forces.

The hydraulic force for water under the sump 301 is equivalent to the pressure of the water, in high water conditions, 3 ft of water equals 1.3 pound of force per square inch multiplied by area of sump. On a 48" diameter sump the force lifting a sump upwards is 2352 pounds of force pushing on the bottom of a sump. The tertiary wall design 303 has a double benefit to strengthen walls of the base of a tank containment sump and allow testing and monitoring of the sumps wall and fittings on the secondary and tertiary walls. Reinforcement of walls become more critical for these types of sumps with bottoms 302. A reinforced foam and/or fiberglass interstitial spacing 304 is utilized.

FIG. 12 illustrates an interstitial wall structure for a tank sump with a manometer 305 connected in fluid communication to the interstitial structure 302. Also to avoid hydraulic forces lifting the tank sump a foam 306 is injected between the tank collar 307, tank 300 and bottom 302 of the tank sump 301. As the foam bonds to the surface of the sump, tank and collar the forces are directed horizontally. The horizontal force from all sides would essentially cancel out itself since the force is pointing inward as opposed to an upward lift.

Some variations of manometers/sensors which are part of the invention are described below. A tertiary containment sump for dispenser or tank sumps with interstitial 401 can be provided. A manometer kit can be provided separately and be installable in the field. Other variations permit filling the manometer and vent liquid through a single fill point 402 probably at the highest point in the tertiary containment sump. The filling of the interstitial may be slowed and testing/trouble shooting using air pressure or vacuum or helium is more difficult since the interstitial is more difficult to drain.

Figure 13:
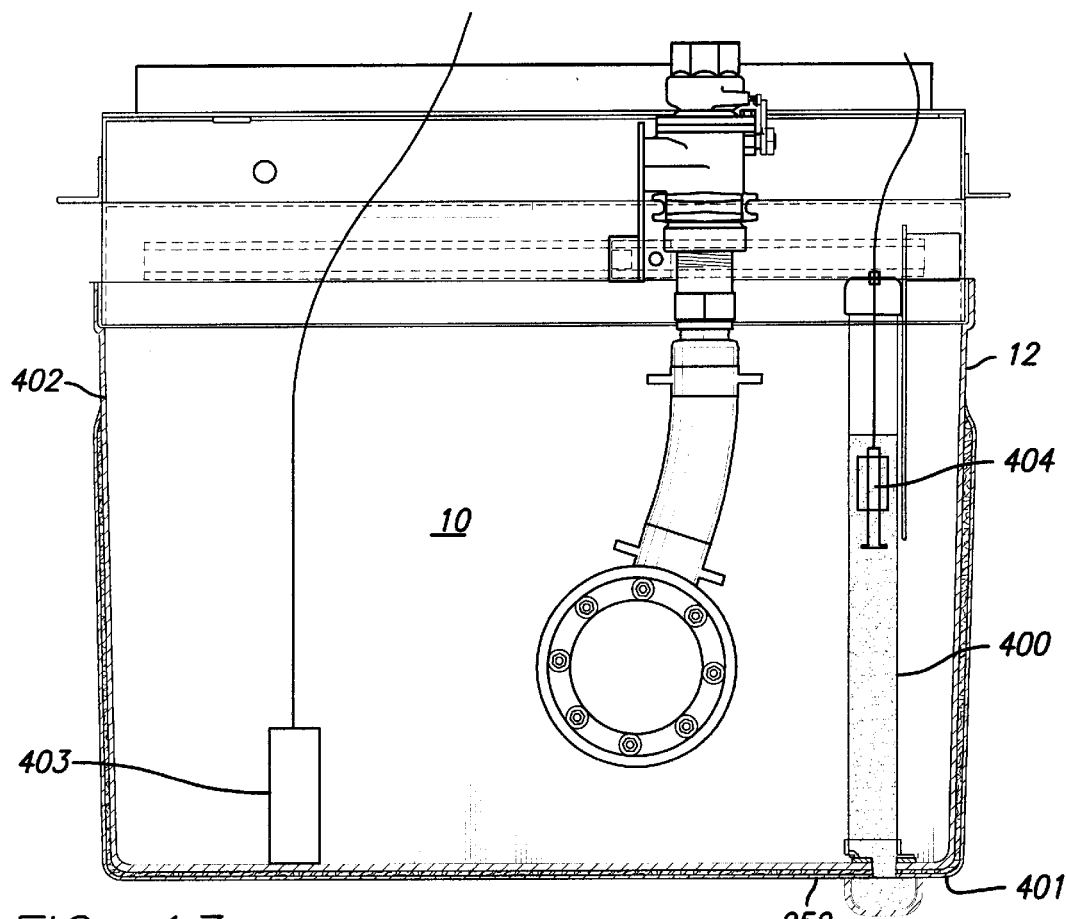
FIG. 13 is a cross-sectional side view of a sump showing the interstitial wall, one port for a gas line to enter the sump, an electronic float sensor with a manometer located at one end of the sump, and an electronic sensor for secondary containment.

Sensors and monitoring of dispenser containment ideally requires a fail safe, fail to alarm, sensor or form of positive shutdown to stop a leak that is detected inside the secondary containment. In a tertiary contained dispenser containment the box illustrated in FIGS. 13 and 14 such a system is provided. In FIG. 13 there is an electronic sensor 403 or mechanical system 404 to control leaks inside the box.

Figure 14:
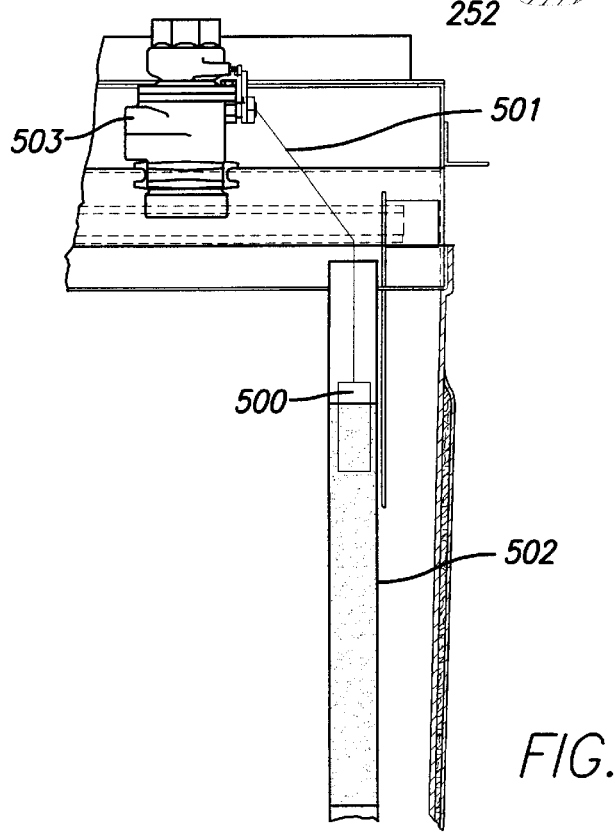
FIG. 14 is a cross-sectional side view of part of a sump showing the interstitial wall, a float sensor with a manometer, and a mechanical linkage between the sensor and a valve for operating the shut off valve.

In one preferred form of this invention one can visually test/and or monitor a sump. In another preferred form, this invention adopts electronic forms of monitoring/testing. One of the walls may include sensors to relate a drop in the interstitial fluid level or a change in the interstitial condition. In FIG. 14 the use of the manometer 502 in tertiary containment is adapted to use the manometer fluid to mechanically trip or close a shear valve 503 to stop the leaking supply pipe. A designer can use the physics of the hydraulic level dropping to actuate a mechanical device 501.

Many different types of sensors could be installed in the manometer to continuously monitor the level. A sensor can use a float to monitor whether the level has dropped below a specific level. The sensor may be immersed in the interstitial fluid to reduce false alarms by allowing for changes in level due to expansion and contraction of air, shifting of pea gravel around the tertiary containment, evaporation, and temperature changes in the interstitial. Another reason for immersion of the sensor is to reduce the chances the float will not be exposed the elements that can lead to the float getting frozen so it will not communicate an alarm.

The sensors are ultimately connected to a module that receives the sensor signal and utilizes that information to perform an action. They will range from notifying, audibly or visually, the user that the containment system lost in integrity of either secondary/tertiary wall or shut off the power to the dispenser or shut off tanks submersible pump that supplies the dispenser with product.

While the specification describes particular embodiments of the present invention, those of ordinary skill can devise variations of the present invention without departing from the inventive concept.

What is claimed is:

1. A sump for inhibiting leakage of liquid contained therein comprising:
   a double wall for at least part of the sump, the sump defining a cavity for containing liquid, the double wall being for at least one of a base or side wall of the sump, the double wall having an exterior wall, the double wall having an interior wall;
   an exterior wall aperture in the exterior wall of the double wall and an interior wall aperture in the interior wall of the double wall, wherein a means for transferring fluid can be inserted through the exterior wall aperture and the interior wall aperture;
   an interstitial space between the double wall;
   a fluid in the interstitial space; and
   a sensor in fluid communication with the fluid in the interstitial space such that a change in the condition of the fluid in the interstitial space causes the sensor to indicate leakage into or from the interstitial space, the sensor being removably secured to an interior wall portion of the double wall with a portion of the sensor extending through the interior wall portion a predetermined distance into the interstitial space so that the sensor will then be able to detect whether there is any leakage in the interstitial space.

2. A sump as claimed in claim 1 including means for locating a gasoline dispenser above the sump, the sump being for containing liquid leaking from at least one of the dispenser or a pipe directed from a source of gasoline to the gasoline dispenser and the pipe being directed at least partly through the sump in its connection between the source and the dispenser.

3. A sump as claimed in claim 1 wherein the sensor is a manometer, the manometer is selectively mounted in the cavity within an inner wall of the double walls and wherein the manometer is in fluid communication with the interstitial space.

4. A sump as claimed in claim 1 including an indictor fluid is a liquid, and wherein the indicator liquid is brine, the brine being selectively colored.

5. A sump as claimed in claim 4 wherein the brine extends from the interstitial space into a manometer, the manometer being mounted at the base of the sump and being directed substantially vertically within the sump, the manometer including a substantially transparent column whereby the brine level can be sensed.

6. A sump as claimed in claim 5 including a measure mounted in adjacency with the manometer column such that changes in the liquid level in the manometer can be detected against a measuring scale.

7. A sump as claimed in claim 6 wherein the manometer is separable from the sump separation being effected by releasing a mounting element, the mounting element being locate with the base of the sump and extending between an inner wall through the interstitial space am to an outer wall of the sump.

8. A sump as claimed in claim 7 wherein the manometer column is made of plastic.

9. A sump as claimed in claim 1 wherein the interstitial space is retained relatively small thereby to permit a relatively small quantity of interstitial fluid to be contained therein such that relatively small changes in fluid condition in the interstitial space, such changes being affected either by the ingress of fluid from the cavity through an inner wall to the interstitial space or the egress of fluid from an outer wall to an area surrounding the outer wall is relatively easily detected by changes reflected in the manometer.

10. A sump as claimed in claim 1 wherein the interstitial space includes bridges, the bridges selectively being formed by fiberglass and the bridges acting to provide enhanced strength collectively to inner and outer walls of the sump.

11. A sump as claimed in claim 1 wherein the fluid in the interstitial space is connected with the sensor thereby to determine the pressure or vacuum changes in the interstitial space.

12. A sump as claimed in claim 1 including a breathing hole located towards the upper limit of the interstitial space, the breathing hole permitting purging of air relative to the interstitial space, thereby to minimize volume fluctuations in fluid level in the interstitial space due to temperature differences.

13. A sump as claimed in claim 1 wherein an outer wall of the interstitial space extends in height up at least up to one-half the height of an inner wall of the sump.

14. A sump as claimed in claim 13 wherein an outer wall extends to a height above the level of a fitting for located tubing passing through the outer wall and the inner wall of the sump wall.

15. A sump as claimed in claim 1 wherein the interstitial space extends around an upwardly wall and a base of the sump.

16. A sump as claimed in claim 1 wherein the double wall includes a base, a wall directed upwardly from the base of the sump towards the top thereby forming a cavity for liquid, and the upwardly directed wall includes an angular portion being directed at an angle from the base greater than 90 degrees relative to the base and a remote location of that portion being connected with a substantially upright wall portion for the sump.

17. A sump as claimed in claim 16 wherein the angular portion extending between the base and the substantially upright wall portion extends at about 135 degrees relative to the base and at about 135 degrees relative to an upright wall of the sump.

18. A sump as claimed in claim 17 including an aperture through the angular portion.

19. A sump as claimed in claim 18 wherein the aperture includes a fitting for receiving a conduit, the conduit being directed substantially at right angles to the angular portion and the conduit including a bend within the sump, the bend being for directing the conduit substantially upwardly and parallel to a upright wall of the sump.

20. A sump as claimed in claim 17 including a bend in the conduit, the bend being in a position removed from the fitting and outwardly located relative to the sump such that the conduit portion after the bend is directed substantially parallel to the base of the sump.

21. A sump as claimed in claim 18 including a bend in the conduit, the bend being in a position removed from the fitting and outwardly located relative to the sump such that the conduit is directed substantially parallel to the base of the sump.

22. A sump as claimed in claim 18 wherein the conduit is integral and continuous between a position removed from the sump and crossing through an aperture in the sump and upwardly in the sump.

23. A sump as claimed in claim 16 wherein the cross section of the sump viewed from the top is substantially rectangular.

24. A sump as claimed in claim 16 wherein an end view of the sump includes a substantially horizontal top, a vertical side wall, the base extending substantially parallel to the top and for a distance partially equal to the distance of the top, and the angular portion extends upwardly to a line about equal to the end of the top, and a vertically directed relatively shorter upwardly directed wall extending between the end of the top and the end of the angular portion remote from the base.

25. A sump as claimed in claim 16 including at least one aperture in the upright wall, the aperture being to receive a pipe containing fluid and for directing the pipe through the sump wall and upwardly to a position above the sump, the upright wall being the wall not directly connected to the angular portion of the sump.

26. A sump as claimed in claim 25 including an aperture in the angular portion, the aperture being in a position relatively closer to the upright wall connected to the angular portion than to the position of joinder of the angular portion with the base.

27. A sump as claimed in claim 16 including a mouth of the sump at the top, the mouth being for receiving a gasoline dispenser and means for passage through the sump of one or more pipes connecting the gasoline dispenser with the environment outside of the sump.

28. A sump as claimed in claim 27 wherein one or more pipe(s) is for directing gasoline from an environment outside of the sump through the sump and to the dispenser and including a conduit for directing electrical conductors from an environment outside of the sump through the sump to the dispenser.

29. A sump as claimed in claim 28 wherein the electrical conduit includes a vertically directed portion, a portion angled at about 135 degrees relative to the vertical portion and passing through an aperture in the angular portion of the sump, and a further bend in the conduit of about 135 degrees at a position remote and outside of the sump, the conduit being for directing electrical conductors from outside of the sump through the sump and above the sump.

30. A sump for inhibiting leakage of liquid contained therein comprising:
   a double wall for at least part of the sump, the sump defining a cavity for containing liquid, the double wall being for at least one of a base or side wall of the sump, the double wall having an exterior wall, the double wall having an interior wall;
   an exterior wall aperture in the exterior wall of the double wall and an interior wall aperture in the interior wall of the double wall, wherein a means for transferring fluid can be inserted through the exterior wall aperture and the interior wall aperture;
   an interstitial space between the double wall;

a fluid in the interstitial space;

a sensor in fluid communication with the fluid in the interstitial space such that a change in the level of the fluid in the interstitial space causes the sensor to indicate leakage into or from the interstitial space, the sensor being removably secured to an interior wall portion of the double wall with a portion of the sensor extending through the interior wall portion a predetermined distance into the interstitial space so that the sensor will then be able to detect whether there is any leakage in the interstitial space; and the sensor being a manometer, and the manometer being selectively mounted in the cavity within an inner wall of the double walls and wherein the manometer is in fluid communication with the interstitial space.

31. A sump as claimed in claim 30 including means for locating a gasoline dispenser above the sump, the sump being for containing liquid leaking from at least one of the dispenser or a pipe directed from a source of gasoline to the gasoline dispenser and the pipe being directed at least partly through the sump in its connection between the source and the dispenser.

32. A sump as claimed in claim 30 including an indictor fluid is a liquid, and wherein the indicator liquid is brine, the brine being selectively colored, and wherein the brine extends from the interstitial space into the manometer, the manometer being mounted at the base of the sump and being directed substantially vertically within the sump, the manometer including a substantially transparent column whereby the brine level can be sensed.

33. A sump as claimed in claim 32 including a measure mounted in adjacency with the manometer column such that changes in the liquid level in the manometer can be detected against a measuring scale.

34. A sump as claimed in claim 30 wherein the manometer is separable from the sump, separation being effected by releasing a mounting element, the mounting element being located with the base of the sump and extending between an inner wall through the interstitial space and to an outer wall of the sump.

35. A sump for inhibiting leakage of liquid contained therein comprising:

a double wall for at least part of the sump, the sump defining a cavity for containing liquid, the double wall being for at least one of a base or side wall of the sump;

an interstitial space between the double wall;

a brine liquid in the interstitial space;

a sensor in fluid communication with the brine liquid in the interstitial space such that a change in the level of the fluid in the interstitial space causes the sensor to indicate leakage into or from the interstitial space, the sensor being removably secured to an interior wall portion of the double wall with a portion of the sensor extending through the interior wall portion a predetermined distance into the interstitial space so that the sensor will then be able to detect whether there is any leakage in the interstitial space;

the sensor being a manometer, and the manometer being selectively mounted in the cavity within an inner wall of the double walls and wherein the manometer is in fluid communication with the brine liquid in the interstitial space; and means for locating a gasoline dispenser above the sump, the sump being for containing liquid leaking from at least one of the dispenser or a pipe directed from a source of gasoline to the gasoline dispenser and the pipe being directed at least partly through the sump in its connection between the source and the dispenser.

36. A sump as claimed in claim 35 wherein the interstitial space is retained relatively small thereby to permit a relatively small quantity of interstitial fluid to be contained therein such that relatively small changes in fluid condition in the interstitial space, such changes being affected either by the ingress of fluid from the cavity through an inner wall to the interstitial space or the egress of fluid from an outer wall to an area surrounding the outer wall is relatively easily detected by changes reflected in the manometer.

37. A sump as claimed in claim 35 wherein the interstitial space includes bridges, the bridges selectively being formed by fiberglass and the bridges acting to provide enhanced strength collectively to inner and, outer walls of the sump.

38. A sump as claimed in claim 35 wherein the brine liquid in the interstitial space is connected with the sensor thereby to determine the pressure or vacuum changes in the interstitial space.

39. A sump as claimed in claim 35 including a breathing hole located towards the upper limit of the interstitial space, the breathing hole permitting purging of air relative to the interstitial space, thereby to minimize volume fluctuations in brine liquid level in the interstitial space due to temperature differences.

40. A sump as claimed in claim 35 wherein an outer wall of the interstitial space extends in height up at least up to one-half the height of an inner wall of the sump.

41. A sump as claimed in claim 35 wherein an outer wall extends to a height above the level of a fitting for located tubing passing through the outer wall and the inner wall of the sump wall.

42. A sump as claimed in claim 35 wherein the interstitial space extends around an upwardly wall and a base of the sump.

43. A sump for inhibiting leakage of liquid contained therein comprising:

a double wall for at least part of the sump, the sump defining a cavity for containing liquid, the double wall being for at least one of a base or side wall of the sump, the double wall having an exterior wall, the double wall having an interior wall;

an exterior wall aperture in the exterior wall of the double wall and an interior wall aperture in the interior wall of the double wall, wherein a means for transferring fluid can be inserted through the exterior wall aperture and the interior wall aperture;

an interstitial space between the double wall;

a fluid in the interstitial space;

a sensor in fluid communication with the fluid in the interstitial space such that a change in the condition of the fluid in the interstitial space causes the sensor to indicate leakage into or from the interstitial space, the sensor being removably secured to an interior wall portion of the double wall with a portion of the sensor extending through the interior wall portion a predetermined distance into the interstitial space so that the sensor will then be able to detect whether there is any leakage in the interstitial space; and the sensor means being connected for communicating a change in the fluid condition to an indicator.

44. A sump as claimed in claim 43 wherein the sensor is a manometer, the manometer is selectively mounted in the cavity within an inner wall of the double walls and wherein the manometer is in fluid communication with the interstitial space.

45. A sump as claimed in claim 43 including a valve for connection to the sensor, the valve being for shutting of a fluid path in the event a predetermined amount of change in condition of the sensor, such predetermined amount of change being representative of a predetermined amount of change of the condition of the fluid in the interstitial space.

46. A sensor for a sump for inhibiting leakage of liquid contained therein the sump having a double wall for at least part of the sump, the double wall being for at least one of a base or side wall of the sump the sump defining a cavity for containing liquid, the double wall having an exterior wall, the double wall having an interior wall; an exterior wall aperture in the exterior wall of the double wall and an interior wall aperture in the interior wall of the double wall, wherein a means for transferring fluid can be inserted through the exterior wall aperture and the interior wall aperture; an interstitial space between the double wall; a fluid in the interstitial space, the sensor comprising:

a body for fluid communication with a fluid in the interstitial space such that a change in the condition of the fluid in the interstitial space causes the sensor to indicate leakage into or from the interstitial space, the sensor being removably secured to an interior wall portion of the double wall with a portion of the sensor extending through the interior wall portion a predetermined distance into the interstitial space so that the sensor will then be able to detect whether there is any leakage in the interstitial space.

47. A sensor as claimed in claim 46 including a manometer, the manometer being selectively for mounting in a cavity within an inner wall of the double walls and wherein the manometer is in fluid communication with the interstitial space.

48. A sump for inhibiting leakage of liquid contained therein comprising:

a double wall for at least part of the sump, the sump defining a cavity for containing liquid, the double wall being for at least one of a base or side wall of the sump, the double wall having an exterior wall, the double wall having an interior wall;

an exterior wall aperture in the exterior wall of the double wall and an interior wall aperture in the interior wall of the double wall, wherein a means for transferring fluid can be inserted through the exterior wall aperture and the interior wall aperture;

an interstitial space between the double wall;

a fluid in the interstitial space; and a sensor in the cavity of the sump, such that a change in the condition of the fluid in the interstitial space causes the sensor to indicate leakage into or from the interstitial space, the sensor being removably secured to an interior wall portion of the double wall with a portion of the sensor extending through the interior wall portion a predetermined distance into the interstitial space so that the sensor will then be able to detect whether there is any leakage in the interstitial space.

49. A sump for inhibiting leakage of liquid contained therein comprising:

a double wall for at least part of the sump, the sump defining a cavity for containing liquid, the double wall being for at least one of a base or side wall of the sump, the double wall having an exterior wall, the double wall having an interior wall;

an exterior wall aperture in the exterior wall of the double wall and an interior wall aperture in the interior wall of the double wall, wherein a means for transferring fluid can be inserted through the exterior wall aperture and the interior wall aperture;

an interstitial space between the double wall; and a sensor connected with the interstitial space, such that a change in the condition in the interstitial space causes the sensor to indicate leakage into or from the interstitial space, the sensor being removably secured to an interior wall portion of the double wall with a portion of the sensor extending through the interior wall portion a predetermined distance into the interstitial space so that the sensor will then be able to detect whether there is any leakage in the interstitial space.

50. A sump as claimed in claim 49 wherein the sensor is located at a relative low point in relation to the sump base.

51. A sump as claimed in claim 49 wherein the sensor is located at a location outside of the sump.

52. A sump for location below a ground level and for cooperation with a tank sump for storing gasoline for subsequent delivery to a gasoline dispenser comprising:

a base;

a wall directed upwardly from the base of the sump towards a top thereby forming a cavity;

the base being for location on a tank sump collar, the collar giving access to tank sump for storing gasoline;

at least one of the base or the wall of the sump is formed by at least two elements and includes said interstitial space between the two elements, there being a fluid in the interstitial space; and a sensor, preferably a manometer, in fluid connection with the interstitial space, the sensor being for determining fluid changes in the interstitial space, such changes being an indication of fluid passage through at least one of the elements being the wall or base, the sensor being removably secured to an interior wall portion of the two elements with a portion of the sensor extending through the interior wall portion a predetermined distance into the interstitial space so that the sensor will then be able to detect whether there is any leakage in the interstitial space.

53. A sump for inhibiting leakage of liquid contained therein comprising:

an interior wall positioned in at least part of the sump;

an exterior wall positioned in at least part of the sump;

an aperture that extends through the interior wall and the exterior wall, wherein a means for transferring fluid can be inserted through the aperture, an interstitial space between the interior wall and the exterior wall;

a fluid in the interstitial space; and a sensor in fluid communication with the fluid in the interstitial space such that a change in the condition of the fluid in the interstitial space causes the sensor to indicate leakage into or from the interstitial space, the sensor being removably secured to an interior wall portion of the double wall with a portion of the sensor extending through the interior wall portion a predetermined distance into the interstitial space so that the sensor will then be able to detect whether there is any leakage in the interstitial space.

54. A sump as claimed in claim 53 including means for locating a gasoline dispenser above the sump, the sump being for containing liquid leaking from at least one of the dispenser or a pipe directed from a source of gasoline to the gasoline dispenser and the pipe being directed at least partly though the sump in its connection between the source and the dispenser.

55. A sump as claimed in claim 53 including an indictor fluid is a liquid, and wherein the indicator liquid is brine, the brine being selectively colored, and wherein the brine extends from the interstitial space into the manometer, the manometer being mounted at the base of the sump and being directed substantially vertically within the sump, the manometer including a substantially transparent column whereby the brine level can be sensed.

56. A sump as claimed in claim 53 including a measure mounted in adjacency with the manometer column such that changes in the liquid level in the manometer can be detected against a measuring scale.

57. A sump as claimed in claim 53 wherein the manometer is separable from the sump, separation being effected by releasing a mounting element, the mounting element being located with the base of the sump and extending between an inner wall through the interstitial space and to an outer wall of the sump.

58. A sump for inhibiting leakage of liquid contained therein comprising:
a double wall for at least part of the sump, the sump defining a cavity for containing liquid, the double wall being for at least one of the a base or side wall of the sump, the double wall having an exterior wall, the double wall having an interior wall;
an exterior wall aperture in the exterior wall of the double wall and an interior wall aperture in the interior wall of the double wall, wherein a means for transferring fluid can be inserted through the exterior wall aperture and the interior wall aperture;
a fitting positioned in the exterior wall aperture and interior wall aperture, wherein the fitting can receive a means for transferring fluids;
an interstitial space between the double wall;
a fluid in the interstitial space; and
a sensor in fluid communication with the fluid in the interstitial space such that a change in the condition of the fluid in the interstitial space causes the sensor to indicate leakage into or from the interstitial space, the sensor being removably secured to an interior wall portion of the double wall with a portion of the sensor extending through the interior wall portion a predetermined distance into the interstitial space so that the sensor will then be able to detect whether there is any leakage in the interstitial space.

59. A sump as claimed in claim 58 including means for locating a gasoline dispenser above the sump, the sump being for containing liquid leaking from at least one of the dispenser or a pipe directed from a source of gasoline to the gasoline dispenser and the pipe being directed at least partly through the sump in its connection between the source and the dispenser.

60. A sump as claimed in claim 58 including an indictor fluid is a liquid, and wherein the indicator liquid is brine, the brine being selectively colored, and wherein the brine extends from the interstitial space into the manometer, the manometer being mounted at the base of the sump and being directed substantially vertically within the sump, the manometer including a substantially transparent column whereby the brine level can be sensed.

61. A sump as claimed in claim 58 including a measure mounted in adjacency with the manometer column such that changes in the liquid level in the manometer can be detected against a measuring scale.

62. A sump as claimed in claim 58 wherein the manometer is separable from the sump, separation being effected by releasing a mounting element, the mounting element being located with the base of the sump and extending between an inner wall through the interstitial space and to an outer wall of the sump.

63. A sump for inhibiting leakage of liquid contained therein comprising:
a double wall for at least part of the sump, the sump defining a cavity for containing liquid, the double wall being for at least one of the a base or side wall of the sump;
a means for locating a gasoline dispenser above the sump, the sump being for containing liquid leaking from at least one of the dispenser or a pipe directed from a source of gasoline to the gasoline dispenser and the pipe being directed at least partly through the sump in its connection between the source and the dispenser;
an interstitial space between the double wall;
a fluid in the interstitial space; and
a sensor in fluid communication with the fluid in the interstitial space such that a change in the condition of the fluid in the interstitial space causes the sensor to indicate leakage into or from the interstitial space, the sensor being removably secured to an interior wall portion of the double wall with a portion of the sensor extending through the interior wall portion a predetermined distance into the interstitial space so that the sensor will then be able to detect whether there is any leakage in the interstitial space.

64. A sump as claimed in claim 63 including an indictor fluid is a liquid, and wherein the indicator liquid is brine, the brine being selectively colored, and wherein the brine extends from the interstitial space into the manometer, the manometer being mounted at the base of the sump and being directed substantially vertically within the sump, the manometer including a substantially transparent column whereby the brine level can be sensed.

65. A sump as claimed in claim 63 including a measure mounted in adjacency with the manometer column such that changes in the liquid level in the manometer can be detected against a measuring scale.

66. A sump as claimed in claim 63 wherein the manometer is separable from the sump, separation being effected by releasing a mounting element, the mounting element being located with the base of the sump and extending between an inner wall through the interstitial space and to an outer wall of the sump.

67. A sump for inhibiting leakage of liquid contained therein comprising:
a double wall for at least part of the sump, the sump defining a cavity for containing liquid, the double wall being for at least one of the a base or side wall of the sump, the double wall having an exterior wall, the double wall having an interior wall;
an exterior wall aperture in the exterior wall of the double wall and an interior wall aperture in the interior wall of the double wall, wherein a means for transferring vapor can be inserted through the exterior wall aperture and the interior wall aperture;
an interstitial space between the double wall;
a vapor in the interstitial space; and
a sensor in vapor communication with the vapor in the interstitial space such that a change in the condition of the vapor in the interstitial space causes the sensor to indicate leakage into or from the interstitial space, the sensor being removably secured to an interior wall portion of the double wall with a portion of the sensor extending through the interior wall portion a predetermined distance into the interstitial space so that the sensor will then be able to detect whether there is any leakage in the interstitial space.

68. A sump as claimed in claim 67 including means for locating a gasoline dispenser above the sump, the sump being for containing liquid leaking from at least one of the dispenser or a pipe directed from a source of gasoline to the gasoline dispenser and the pipe being directed at least partly through the sump in its connection between the source and the dispenser.

69. A sump as claimed in claim 67 wherein the sensor is a manometer, the manometer is selectively mounted in the cavity within an inner wall of the double walls and wherein the manometer is in vapor communication with the interstitial space.

70. A sump as claimed in claim 67 including a measure mounted in adjacency with the manometer column such that changes in the vapor level in the manometer can be detected against a measuring scale.

71. A sump as claimed in claim 67 wherein the manometer is separable from the sump, separation being effected by releasing a mounting element, the mounting element being located with the base of the sump and extending between an inner wall through the interstitial space and to an outer wall of the sump.

72. A sump for inhibiting leakage of liquid contained therein comprising:

a double wall for at least part of the sump, the sump defining a cavity for containing liquid, the wall being for at least one of the a base or side wall of the sump;

an interstitial space between the double wall;

a liquid in the interstitial space;

a sensor in fluid communication with the liquid in the interstitial space such that a change in the level of the fluid in the interstitial space causes the sensor to indicate leakage into or from the interstitial space, the sensor being removably secured to an interior wall portion of the double wall with a portion of the sensor extending through the interior wall portion a predetermined distance into the interstitial space so that the sensor will then be able to detect whether there is any leakage in the interstitial space;

the sensor being a manometer, and the manometer being selectively mounted in the cavity within an inner wall of the double walls and wherein the manometer is in fluid communication with the liquid in the interstitial space; and means for locating a gasoline dispenser above the sump, the sump being for containing liquid leaking from at least one of the dispenser or a pipe directed from a source of gasoline to the gasoline dispenser and the pipe being directed at least partly through the sump in its connection between the source and the dispenser.

73. The sump of claim 72, wherein the liquid is brine.

74. The sump of claim 72, wherein the liquid is propylene glycol.

* * * * *